(12) United States Patent
Calley et al.

(10) Patent No.: US 8,395,291 B2
(45) Date of Patent: Mar. 12, 2013

(54) TRANSVERSE AND/OR COMMUTATED FLUX SYSTEMS FOR ELECTRIC BICYCLES

(75) Inventors: David G. Calley, Flagstaff, AZ (US); Daniel S. Cole, Flagstaff, AZ (US); John M. Dyer, Flagstaff, AZ (US); Thomas F. Janecek, Flagstaff, AZ (US); J. Scott Reynolds, Flagstaff, AZ (US)

(73) Assignee: Electric Torque Machines, Inc., Flagstaff, AZ (US)

( * ) Notice: Subject to any disclaimer, the term of this patent is extended or adjusted under 35 U.S.C. 154(b) by 4 days.

(21) Appl. No.: 12/772,959

(22) Filed: May 3, 2010

(65) Prior Publication Data

US 2011/0169381 A1    Jul. 14, 2011

Related U.S. Application Data

(60) Provisional application No. 61/314,109, filed on Mar. 15, 2010.

(51) Int. Cl.
*H02K 21/12* (2006.01)
*H02K 1/06* (2006.01)

(52) U.S. Cl. .......... 310/156.02; 310/67 R; 310/216.023; 310/216.012

(58) Field of Classification Search ............. 310/156.02, 310/67 R, 216.023, 216.012
See application file for complete search history.

(56) References Cited

U.S. PATENT DOCUMENTS

| | | | |
|---|---|---|---|
| 1,361,136 A | 12/1920 | Burke | |
| 2,078,668 A | 4/1937 | Kilgore | |
| 2,122,307 A | 6/1938 | Welch | |
| 3,403,273 A | 9/1968 | Hiroshi | |
| 3,437,854 A | 4/1969 | Oiso | |
| 3,558,941 A | 1/1971 | Visconti Brebbia et al. | |
| 3,700,942 A | 10/1972 | Alth | |
| 3,710,158 A | 1/1973 | Bachle et al. | |
| 3,774,059 A | 11/1973 | Cox | |
| 3,869,625 A | 3/1975 | Sawyer | |
| 3,984,711 A | 10/1976 | Kordik | |
| 3,999,107 A | 12/1976 | Reuting | |
| 4,021,691 A | 5/1977 | Dukshtau et al. | |
| 4,114,057 A | 9/1978 | Esters | |
| 4,127,802 A | 11/1978 | Johnson | |
| 4,206,374 A | 6/1980 | Goddijn | |
| 4,237,396 A | 12/1980 | Blenkinsop et al. | |
| 4,237,397 A | 12/1980 | Mohr et al. | |

(Continued)

FOREIGN PATENT DOCUMENTS

| CN | 201264675 | 7/2009 |
|---|---|---|
| CN | 101552534 | 10/2009 |

(Continued)

OTHER PUBLICATIONS

Restriction Requirement dated Dec. 20, 2010 for U.S. Appl. No. 12/149,933.

(Continued)

*Primary Examiner* — Tran N. Nguyen
*Assistant Examiner* — Alex W Mok
(74) *Attorney, Agent, or Firm* — Pillsbury Winthrop Shaw Pittman LLP

(57) ABSTRACT

Electrical machines, for example transverse flux machines and/or commutated flux machines, may be configured to be coupled to an electric bicycle or other light electric vehicle. Certain exemplary electrical machines may be configured with a high torque density and/or lower operating losses, providing improved operational characteristics to an e-bike. Moreover, certain exemplary electrical machines may replace a gear cassette on a bicycle, allowing conversion of the bicycle from manual to electric operation.

26 Claims, 22 Drawing Sheets

U.S. PATENT DOCUMENTS

| | | | |
|---|---|---|---|
| 4,255,684 A | 3/1981 | Mischler et al. | |
| 4,255,696 A | 3/1981 | Field, II | |
| 4,286,180 A | 8/1981 | Langley | |
| 4,306,164 A | 12/1981 | Itoh et al. | |
| 4,339,875 A * | 7/1982 | Muller | 29/602.1 |
| 4,363,988 A | 12/1982 | Kliman | |
| 4,388,545 A | 6/1983 | Honsinger et al. | |
| 4,392,072 A | 7/1983 | Rosenberry | |
| 4,459,501 A | 7/1984 | Fawzy | |
| 4,501,980 A | 2/1985 | Welburn | |
| 4,508,984 A | 4/1985 | Guedj | |
| 4,605,874 A | 8/1986 | Whiteley | |
| 4,611,139 A | 9/1986 | Godkin et al. | |
| 4,620,752 A | 11/1986 | Fremerey et al. | |
| 4,639,626 A | 1/1987 | McGee | |
| 4,658,166 A | 4/1987 | Oudet | |
| 4,704,555 A | 11/1987 | Stokes | |
| 4,794,286 A | 12/1988 | Taenzer | |
| 4,797,602 A | 1/1989 | West | |
| 4,801,834 A | 1/1989 | Stokes | |
| 4,835,840 A | 6/1989 | Stokes | |
| 4,850,100 A | 7/1989 | Stokes | |
| 4,857,786 A | 8/1989 | Nihei et al. | |
| 4,883,999 A | 11/1989 | Hendershot | |
| 4,899,072 A | 2/1990 | Ohta | |
| 4,900,965 A | 2/1990 | Fisher | |
| 4,959,577 A | 9/1990 | Radomski | |
| 4,990,812 A | 2/1991 | Nam | |
| 5,015,903 A * | 5/1991 | Hancock et al. | 310/168 |
| 5,038,066 A | 8/1991 | Pawlak et al. | |
| 5,051,641 A | 9/1991 | Weh | |
| 5,062,012 A | 10/1991 | Maeda et al. | |
| 5,097,167 A | 3/1992 | Kanayama et al. | |
| 5,117,142 A | 5/1992 | von Zweygbergk | |
| 5,130,595 A | 7/1992 | Arora | |
| 5,132,581 A | 7/1992 | Kusase | |
| 5,164,623 A * | 11/1992 | Shkondin | 310/67 R |
| 5,177,054 A | 1/1993 | Lloyd | |
| 5,195,231 A | 3/1993 | Fanning et al. | |
| 5,208,503 A | 5/1993 | Hisey | |
| 5,212,419 A | 5/1993 | Fisher et al. | |
| 5,214,333 A | 5/1993 | Kawamura | |
| 5,250,865 A | 10/1993 | Meeks | |
| 5,262,746 A | 11/1993 | Masuda | |
| 5,278,470 A | 1/1994 | Neag | |
| 5,289,072 A | 2/1994 | Lange | |
| 5,306,977 A | 4/1994 | Hayashi | |
| 5,370,200 A | 12/1994 | Takata | |
| 5,382,859 A | 1/1995 | Huang et al. | |
| 5,386,166 A | 1/1995 | Reimer et al. | |
| 5,474,148 A | 12/1995 | Takata | |
| 5,477,841 A | 12/1995 | Trost et al. | |
| 5,485,072 A | 1/1996 | Fehringer | |
| 5,530,308 A | 6/1996 | Fanning et al. | |
| 5,543,674 A | 8/1996 | Koehler | |
| 5,543,677 A | 8/1996 | Fakler | |
| 5,633,551 A | 5/1997 | Weh | |
| 5,650,680 A | 7/1997 | Chula | |
| 5,696,419 A | 12/1997 | Rakestraw et al. | |
| 5,712,521 A | 1/1998 | Detela | |
| 5,717,262 A | 2/1998 | Muller | |
| 5,723,921 A | 3/1998 | Sugiura | |
| 5,726,514 A | 3/1998 | Wurz et al. | |
| 5,729,065 A | 3/1998 | Fremery et al. | |
| 5,731,649 A | 3/1998 | Caamano | |
| 5,773,910 A | 6/1998 | Lange | |
| 5,777,418 A | 7/1998 | Lange et al. | |
| 5,780,953 A | 7/1998 | Umeda et al. | |
| 5,814,907 A | 9/1998 | Bandera | |
| 5,835,016 A * | 11/1998 | Ho et al. | 340/568.1 |
| 5,839,530 A | 11/1998 | Dietzel | |
| 5,879,265 A | 3/1999 | Bek | |
| 5,886,449 A | 3/1999 | Mitcham | |
| 5,889,348 A | 3/1999 | Muhlberger et al. | |
| 5,894,183 A | 4/1999 | Borchert | |
| 5,909,339 A | 6/1999 | Hong | |
| 5,925,965 A | 7/1999 | Li et al. | |
| 5,942,828 A | 8/1999 | Hill | |
| 5,954,779 A | 9/1999 | Dietzel | |
| 5,973,436 A | 10/1999 | Mitcham | |
| 5,994,802 A | 11/1999 | Shichijyo et al. | |
| 5,994,814 A | 11/1999 | Kawabata | |
| 6,028,377 A | 2/2000 | Sakamoto | |
| 6,043,579 A * | 3/2000 | Hill | 310/164 |
| 6,060,810 A | 5/2000 | Lee et al. | |
| 6,066,906 A | 5/2000 | Kalsi | |
| 6,097,118 A | 8/2000 | Hull | |
| 6,097,126 A | 8/2000 | Takura | |
| 6,118,159 A | 9/2000 | Willer et al. | |
| 6,121,712 A | 9/2000 | Sakamoto | |
| 6,133,655 A | 10/2000 | Suzuki et al. | |
| 6,133,664 A | 10/2000 | Torok et al. | |
| 6,133,669 A | 10/2000 | Tupper | |
| 6,137,202 A | 10/2000 | Holmes et al. | |
| 6,154,013 A | 11/2000 | Caamano | |
| 6,163,097 A | 12/2000 | Smith et al. | |
| 6,175,177 B1 | 1/2001 | Sabinski et al. | |
| 6,177,748 B1 | 1/2001 | Katcher et al. | |
| 6,181,035 B1 | 1/2001 | Acquaviva | |
| 6,194,799 B1 | 2/2001 | Miekka | |
| 6,215,616 B1 * | 4/2001 | Phan et al. | 360/99.08 |
| 6,229,238 B1 | 5/2001 | Graef | |
| 6,232,693 B1 | 5/2001 | Gierer et al. | |
| 6,236,131 B1 | 5/2001 | Schafer | |
| 6,246,561 B1 | 6/2001 | Flynn | |
| 6,276,479 B1 | 8/2001 | Suzuki et al. | |
| 6,278,216 B1 * | 8/2001 | Li | 310/424 |
| 6,288,467 B1 | 9/2001 | Lange et al. | |
| 6,300,702 B1 | 10/2001 | Jack et al. | |
| 6,304,010 B1 | 10/2001 | Sugiura | |
| 6,333,582 B1 | 12/2001 | Asao | |
| 6,342,746 B1 | 1/2002 | Flynn | |
| 6,365,999 B1 | 4/2002 | Muhlberger et al. | |
| 6,445,105 B1 | 9/2002 | Kliman et al. | |
| 6,448,687 B2 | 9/2002 | Higashino et al. | |
| 6,455,970 B1 | 9/2002 | Shafer et al. | |
| 6,472,792 B1 | 10/2002 | Jack et al. | |
| 6,492,758 B1 | 12/2002 | Gianni et al. | |
| 6,508,321 B1 | 1/2003 | Mueller | |
| 6,545,382 B1 | 4/2003 | Bennett | |
| 6,603,060 B1 | 8/2003 | Ohashi et al. | |
| 6,603,237 B1 | 8/2003 | Caamano | |
| 6,629,574 B2 * | 10/2003 | Turner | 180/206.4 |
| 6,657,329 B2 | 12/2003 | Kastinger et al. | |
| 6,664,704 B2 | 12/2003 | Calley | |
| 6,700,271 B2 | 3/2004 | Detela | |
| 6,707,208 B2 | 3/2004 | Durham et al. | |
| 6,717,297 B2 | 4/2004 | Sadarangani et al. | |
| 6,750,582 B1 | 6/2004 | Neet | |
| 6,765,321 B2 | 7/2004 | Sakamoto | |
| 6,774,512 B2 | 8/2004 | Takagi et al. | |
| 6,791,225 B2 | 9/2004 | Campbell et al. | |
| 6,794,791 B2 | 9/2004 | Ben Ahmed et al. | |
| 6,806,602 B2 | 10/2004 | Hilzinger | |
| 6,815,863 B1 | 11/2004 | Jack et al. | |
| 6,835,941 B1 | 12/2004 | Tanaka | |
| 6,841,908 B2 | 1/2005 | Hasegawa | |
| 6,847,135 B2 | 1/2005 | Kastinger et al. | |
| 6,849,985 B2 | 2/2005 | Jack et al. | |
| 6,853,112 B2 | 2/2005 | Nakamura et al. | |
| 6,866,111 B2 | 3/2005 | Dube | |
| 6,867,530 B2 | 3/2005 | Gamm et al. | |
| 6,879,080 B2 | 4/2005 | Caamano | |
| 6,882,066 B2 | 4/2005 | Kastinger | |
| 6,882,077 B2 | 4/2005 | Neet | |
| 6,885,124 B2 | 4/2005 | Neet | |
| 6,885,129 B1 | 4/2005 | Oohashi et al. | |
| 6,888,272 B2 | 5/2005 | Kastinger | |
| 6,924,576 B2 | 8/2005 | Zierer | |
| 6,924,579 B2 | 8/2005 | Calley | |
| 6,940,197 B2 | 9/2005 | Fujita et al. | |
| 6,949,855 B2 | 9/2005 | Dubois et al. | |
| 6,952,068 B2 | 10/2005 | Gieras | |
| 6,960,860 B1 | 11/2005 | DeCristofaro | |
| 6,960,862 B2 | 11/2005 | Hill | |
| 6,979,925 B2 | 12/2005 | Schwamm | |
| 6,989,622 B1 | 1/2006 | Chen et al. | |

| | | |
|---|---|---|
| 7,015,603 B2 | 3/2006 | Barrho et al. |
| 7,026,737 B2 | 4/2006 | Angerer et al. |
| 7,030,529 B2 | 4/2006 | Dommsch et al. |
| 7,030,534 B2 | 4/2006 | Caamano |
| 7,034,425 B2 | 4/2006 | Detela |
| 7,064,469 B2 | 6/2006 | Jack et al. |
| 7,067,954 B2 | 6/2006 | Kuribayashi et al. |
| 7,071,593 B2 | 7/2006 | Matsushita et al. |
| 7,124,495 B2 | 10/2006 | Gieras |
| 7,126,313 B2 | 10/2006 | Dooley |
| 7,129,602 B2 | 10/2006 | Lange et al. |
| 7,135,802 B2 | 11/2006 | Seki et al. |
| 7,208,856 B2 | 4/2007 | Imai et al. |
| 7,211,922 B2 | 5/2007 | Isoda et al. |
| 7,216,732 B2 | 5/2007 | Angerer |
| 7,230,361 B2 | 6/2007 | Hirzel |
| 7,242,118 B2 | 7/2007 | Sakamoto |
| 7,245,055 B2 | 7/2007 | Jack |
| 7,250,704 B1 | 7/2007 | Sortore et al. |
| 7,259,483 B2 | 8/2007 | Komiya et al. |
| 7,261,186 B2 | 8/2007 | Deplazes |
| 7,265,472 B2 | 9/2007 | Mitcham |
| 7,268,456 B2 | 9/2007 | Harada et al. |
| 7,275,844 B2 * | 10/2007 | Watanabe ..................... 362/473 |
| 7,279,820 B2 | 10/2007 | Grundl et al. |
| 7,358,639 B2 | 4/2008 | Caamano |
| 7,385,329 B2 | 6/2008 | Hill |
| 7,385,330 B2 | 6/2008 | Trzynadlowski et al. |
| 7,420,312 B2 | 9/2008 | Kitamura et al. |
| 7,466,057 B2 | 12/2008 | Imai et al. |
| 7,474,030 B2 | 1/2009 | Mitcham |
| 7,560,840 B2 | 7/2009 | Lange |
| 7,568,714 B2 | 8/2009 | Sasnowski et al. |
| 7,579,742 B1 | 8/2009 | Rittenhouse |
| 7,585,258 B2 | 9/2009 | Watson et al. |
| 7,592,735 B2 | 9/2009 | Hamada |
| 7,602,095 B2 | 10/2009 | Kusase |
| 7,626,308 B2 | 12/2009 | Kang |
| 7,638,919 B2 | 12/2009 | Pulnikov et al. |
| 7,679,253 B2 | 3/2010 | Neet |
| 7,719,156 B2 | 5/2010 | Muehlberger |
| 7,800,275 B2 | 9/2010 | Calley |
| 7,851,965 B2 | 12/2010 | Calley |
| 7,859,141 B2 | 12/2010 | Sadarangani |
| 7,863,797 B2 | 1/2011 | Calley |
| 7,868,508 B2 | 1/2011 | Calley et al. |
| 7,868,511 B2 | 1/2011 | Calley |
| 7,876,019 B2 | 1/2011 | Calley |
| 7,923,886 B2 | 4/2011 | Calley et al. |
| 7,952,252 B2 | 5/2011 | Kang |
| 7,973,446 B2 | 7/2011 | Calley et al. |
| 2001/0001528 A1 | 5/2001 | Ragaly |
| 2001/0030479 A1 | 10/2001 | Mohler |
| 2001/0030486 A1 | 10/2001 | Pijanowski |
| 2001/0030487 A1 | 10/2001 | Higashino |
| 2002/0070627 A1 | 6/2002 | Ward et al. |
| 2002/0113520 A1 | 8/2002 | Kastinger et al. |
| 2002/0135242 A1 | 9/2002 | Kawai |
| 2002/0171315 A1 | 11/2002 | Kastinger |
| 2002/0190585 A1 | 12/2002 | Sakamoto |
| 2003/0048018 A1 | 3/2003 | Sadarangani |
| 2003/0102751 A1 * | 6/2003 | Bryant ..................... 310/112 |
| 2003/0122439 A1 | 7/2003 | Horst |
| 2003/0122440 A1 | 7/2003 | Horst |
| 2003/0122442 A1 | 7/2003 | Jack et al. |
| 2004/0027021 A1 | 2/2004 | Karrelmeyer |
| 2004/0036370 A1 | 2/2004 | Hilzinger |
| 2004/0046478 A1 | 3/2004 | Zierer et al. |
| 2004/0061396 A1 | 4/2004 | Narita et al. |
| 2004/0140730 A1 | 7/2004 | Barrho et al. |
| 2004/0145269 A1 | 7/2004 | Barrho et al. |
| 2004/0150288 A1 | 8/2004 | Calley |
| 2004/0189138 A1 | 9/2004 | Jack |
| 2004/0207281 A1 | 10/2004 | Detela |
| 2004/0207283 A1 * | 10/2004 | Oohashi et al. ............... 310/207 |
| 2004/0212267 A1 | 10/2004 | Jack et al. |
| 2004/0222706 A1 * | 11/2004 | Ickinger ..................... 310/12 |
| 2004/0232793 A1 | 11/2004 | Fujita et al. |
| 2004/0232799 A1 | 11/2004 | Chen et al. |
| 2004/0239207 A1 | 12/2004 | Kloepzig et al. |
| 2004/0251759 A1 | 12/2004 | Hirzel |
| 2004/0251761 A1 | 12/2004 | Hirzel |
| 2004/0262105 A1 | 12/2004 | Li et al. |
| 2005/0006978 A1 | 1/2005 | Bradfield |
| 2005/0012427 A1 | 1/2005 | Seki et al. |
| 2005/0029879 A1 * | 2/2005 | Endo et al. .................. 310/75 C |
| 2005/0040720 A1 * | 2/2005 | Dubois et al. ............ 310/156.02 |
| 2005/0062348 A1 | 3/2005 | Ohnishi et al. |
| 2005/0062352 A1 | 3/2005 | Kastinger |
| 2005/0088056 A1 | 4/2005 | Kuribayashi |
| 2005/0121983 A1 | 6/2005 | Ehrhart |
| 2005/0156479 A1 | 7/2005 | Fujita et al. |
| 2005/0156480 A1 | 7/2005 | Imai |
| 2005/0212381 A1 | 9/2005 | Gilmour et al. |
| 2005/0242679 A1 | 11/2005 | Walter et al. |
| 2006/0012259 A1 | 1/2006 | Kerlin |
| 2006/0012263 A1 | 1/2006 | Smith et al. |
| 2006/0055280 A1 | 3/2006 | Isoda |
| 2006/0082237 A1 | 4/2006 | Kerlin |
| 2006/0087180 A1 | 4/2006 | Woo et al. |
| 2006/0091755 A1 | 5/2006 | Carlisle et al. |
| 2006/0131974 A1 | 6/2006 | Sadarangani et al. |
| 2006/0131986 A1 | 6/2006 | Hsu et al. |
| 2006/0186754 A1 | 8/2006 | Kitamura et al. |
| 2006/0192453 A1 | 8/2006 | Gieras et al. |
| 2006/0220477 A1 | 10/2006 | Okumoto et al. |
| 2006/0261688 A1 | 11/2006 | Akita et al. |
| 2007/0013253 A1 * | 1/2007 | Dubois et al. ............ 310/156.02 |
| 2007/0046137 A1 | 3/2007 | Ooiwa |
| 2007/0046139 A1 | 3/2007 | Ishizuka |
| 2007/0075605 A1 | 4/2007 | Enomoto et al. |
| 2007/0099735 A1 | 5/2007 | Roovers et al. |
| 2007/0138900 A1 | 6/2007 | Imai et al. |
| 2007/0152528 A1 | 7/2007 | Kang et al. |
| 2007/0176505 A1 | 8/2007 | Trzynadlowski et al. |
| 2007/0188037 A1 * | 8/2007 | Lau ........................ 310/152 |
| 2007/0267929 A1 * | 11/2007 | Pulnikov et al. ......... 310/156.02 |
| 2008/0007126 A1 | 1/2008 | Popov et al. |
| 2008/0042507 A1 * | 2/2008 | Edelson ..................... 310/164 |
| 2008/0169776 A1 | 7/2008 | Acker |
| 2008/0179982 A1 | 7/2008 | Kramer |
| 2008/0211326 A1 | 9/2008 | Kang et al. |
| 2008/0211336 A1 | 9/2008 | Sadarangani |
| 2008/0246362 A1 * | 10/2008 | Hirzel ..................... 310/156.02 |
| 2008/0265707 A1 | 10/2008 | Bradfield |
| 2008/0309188 A1 | 12/2008 | Calley |
| 2008/0315700 A1 | 12/2008 | Ishikawa et al. |
| 2009/0021099 A1 * | 1/2009 | Shkondin ..................... 310/203 |
| 2009/0026853 A1 | 1/2009 | Groening |
| 2009/0026866 A1 | 1/2009 | Groening et al. |
| 2009/0085415 A1 | 4/2009 | Ionel et al. |
| 2009/0120211 A1 | 5/2009 | Roovers et al. |
| 2009/0127942 A1 * | 5/2009 | Rahman et al. .................. 310/44 |
| 2009/0160288 A1 | 6/2009 | Calley |
| 2009/0206693 A1 | 8/2009 | Calley et al. |
| 2009/0206696 A1 | 8/2009 | Calley |
| 2009/0208771 A1 | 8/2009 | Janecek |
| 2009/0243406 A1 | 10/2009 | Jack et al. |
| 2009/0255924 A1 | 10/2009 | Lovens |
| 2009/0284253 A1 | 11/2009 | Finkler et al. |
| 2009/0295237 A1 | 12/2009 | Gloor |
| 2009/0322165 A1 | 12/2009 | Rittenhouse |
| 2010/0013341 A1 | 1/2010 | Vollmer |
| 2010/0013343 A1 | 1/2010 | Bi |
| 2010/0026135 A1 * | 2/2010 | Hussey et al. .......... 310/216.111 |
| 2010/0052467 A1 | 3/2010 | Gieras |
| 2011/0025140 A1 | 2/2011 | Pennander et al. |
| 2011/0025141 A1 | 2/2011 | Nord et al. |
| 2011/0037329 A1 | 2/2011 | Nord et al. |
| 2011/0050010 A1 | 3/2011 | Calley et al. |
| 2011/0062723 A1 | 3/2011 | Calley et al. |
| 2011/0133485 A1 | 6/2011 | Gieras |
| 2011/0169357 A1 | 7/2011 | Gieras |

FOREIGN PATENT DOCUMENTS

| | | |
|---|---|---|
| CN | 101834510 | 9/2010 |
| DE | 1513856 | 4/1969 |
| DE | 3626149 | 8/1986 |

| | | |
|---|---|---|
| DE | 3602687 | 8/1987 |
| DE | 8711725 | 8/1987 |
| DE | 3904516 | 6/1990 |
| DE | 3927453 | 2/1991 |
| DE | 4132340 | 3/1993 |
| DE | 19639670 | 4/1998 |
| DE | 19634949 | 5/1998 |
| DE | 19650572 | 6/1998 |
| DE | 19753261 | 6/1998 |
| DE | 19753320 | 6/1998 |
| DE | 199650697 | 6/1998 |
| DE | 19704392 | 8/1998 |
| DE | 19743906 | 4/1999 |
| DE | 19856526 | 6/2000 |
| DE | 19858304 | 6/2000 |
| DE | 19960737 | 7/2001 |
| DE | 10047675 | 4/2002 |
| DE | 10053265 | 5/2002 |
| DE | 10062073 | 6/2002 |
| DE | 10128646 | 1/2003 |
| DE | 10130702 | 1/2003 |
| DE | 10145820 | 4/2003 |
| DE | 102006026719 | 6/2006 |
| DE | 102005020952 | 11/2006 |
| DE | 102006048561 | 4/2008 |
| DE | 102006051234 | 5/2008 |
| DE | 102007018930 | 10/2008 |
| DE | 102008054381 | 6/2010 |
| DE | 102009060955 | 7/2011 |
| DE | 102009060956 | 7/2011 |
| DE | 102009060959 | 7/2011 |
| EP | 0544200 | 11/1992 |
| EP | 0707374 | 4/1996 |
| EP | 0718959 | 6/1996 |
| EP | 0796758 | 9/1997 |
| EP | 0833429 | 4/1998 |
| EP | 0858149 | 8/1998 |
| EP | 0865978 | 9/1998 |
| EP | 0906842 | 4/1999 |
| EP | 0998010 | 3/2000 |
| EP | 1063754 | 12/2000 |
| EP | 1108584 | 6/2001 |
| EP | 1117168 | 7/2001 |
| EP | 1191663 | 3/2002 |
| EP | 1227566 | 7/2002 |
| EP | 1267471 | 12/2002 |
| EP | 1294075 | 3/2003 |
| EP | 1921730 | 5/2008 |
| EP | 1923683 | 5/2008 |
| EP | 2317633 | 5/2011 |
| GB | 518298 | 9/1938 |
| GB | 2052176 | 1/1986 |
| GB | 2287134 | 6/1995 |
| JP | 60241758 | 11/1985 |
| JP | 61042248 | 2/1986 |
| JP | 2001025197 | 1/2001 |
| KR | 1007577330000 | 9/2007 |
| KR | 10-2008-0061415 | 3/2008 |
| KR | 20090058632 | 6/2009 |
| KR | 20110028189 | 3/2011 |
| WO | WO 93/14551 | 7/1993 |
| WO | WO 99/34497 | 7/1999 |
| WO | 0060720 | 10/2000 |
| WO | WO2001/030643 | 5/2001 |
| WO | WO 02/075895 | 9/2002 |
| WO | 03003548 | 1/2003 |
| WO | 2004065068 | 8/2004 |
| WO | WO2004/111591 | 12/2004 |
| WO | WO 2005/091475 | 9/2005 |
| WO | 2006117210 | 5/2006 |
| WO | WO2006/091089 | 8/2006 |
| WO | WO 2007024184 | 3/2007 |
| WO | 2008128659 | 10/2008 |
| WO | WO2009/027938 | 3/2009 |
| WO | WO 2009116935 | 9/2009 |
| WO | WO 2009116936 | 9/2009 |
| WO | WO 2009116937 | 9/2009 |
| WO | WO2009/120211 | 10/2009 |
| WO | WO2009/133295 | 11/2009 |
| WO | WO2009/156297 | 12/2009 |
| WO | WO2010/036221 | 4/2010 |
| WO | WO2010/048928 | 5/2010 |
| WO | 2010076081 | 7/2010 |
| WO | WO2010/094515 | 8/2010 |
| WO | WO2010/133295 | 11/2010 |
| WO | 2011080285 | 7/2011 |
| WO | 2011080293 | 7/2011 |
| WO | 2011080294 | 7/2011 |

OTHER PUBLICATIONS

Final Office Action dated Jan. 4, 2011 for U.S. Appl. No. 12/149,936.
Restriction Requirement dated Feb. 24, 2011 for U.S. Appl. No. 12/942,495.
Notice of Allowance dated Feb. 28, 2011 for U.S. Appl. No. 12/149,936.
"Two Dimensional Finite Analysis of Passive Rotor Transverse Flux Motors with Slanted Rotor Design" by B.E. Hasubek, et al., May 1999.
Notice of Allowance dated Nov. 2, 2010 for U.S. Appl. No. 12/847,991.
Notice of Allowance dated Dec. 9, 2010 for U.S. Appl. No. 12/611,733.
Notice of Allowance dated Mar. 31, 2011 for U.S. Appl. No. 12/948,925.
Notice of Allowance dated Apr. 19, 2011 for U.S. Appl. No. 12/942,495.
ISR & WO dated Apr. 12, 2011 for International Application No. PCT/US2010/033445.
ISR & WO dated Apr. 12, 2011 for International Application No. PCT/US2010/033444.
ISR & WO dated Apr. 12, 2011 for International Application No. PCT/US2010/033446.
International Preliminary Report on Patentability dated May 3, 2011, PCT/US2009/063142.
International Preliminary Report on Patentability dated May 3, 2011, PCT/US2009/063145.
International Preliminary Report on Patentability dated May 3, 2011, PCT/US2009/063147.
Notice of Allowance dated May 23, 2011, U.S. Appl. No. 13/039,837.
Notice of Allowance dated Jul. 8, 2011, U.S. Appl. No. 12/772,958.
Restriction Requirement dated Jul. 7, 2011, U.S. Appl. No. 12/772,962.
Technical Project Presentation—Development of a High-Performance Generator for Wind Turbines—by Andrzej M. Trzynadlowski, PhD, University of Nevada, Reno, FIEEE, Aug. 2007.
"Magnetic Field Calculation of Claw Pole Permanent Magnet Machines Using Magnetic Network Method": J. Elect. Electron. Eng., Australia, vol. 22, No. 1, pp. 69-75, 2002.
"Iron Loss Calculation in a Claw-Pole Structure", by A. Reinap et al., Lund University, Jun. 2004.
Dubois, Maxine R. et al.; "Clawpole Transverse-Flux Machine with Hybrid Stator"; pp. 1-6, Jul. 15, 2006.
Fundamental Modeling for Optimal Design of Transverse Flux Motors—Genevieve Patterson et al., University of Tokyo, 2008.
Raser Technologies Company Brochure, 2005.
ISR and WO dated Jun. 10, 2010 for International Application No. PCT/US2009/063145.
ISR and WO dated Jun. 10, 2010 for International Application No. PCT/US2009/063142.
ISR and WO dated Jun. 18, 2010 for International Application No. PCT/US2009/063147.
Office Action dated May 19, 2010 for U.S. Appl. No. 12/149,934.
Office Action dated Jul. 27, 2010 for U.S. Appl. No. 12/149,936.
Office Action dated Aug. 9, 2010 for U.S. Appl. No. 12/611,733.
Notice of Allowance dated Aug. 12, 2010 for U.S. Appl. No. 12/611,728.
Notice of Allowance dated Aug. 19, 2010 for U.S. Appl. No. 12/611,737.
Notice of Allowance dated Sep. 8, 2010 for U.S. Appl. No. 12/149,934.
Notice of Allowance dated Oct. 6, 2010 for U.S. Appl. No. 12/149,935.

Office Action dated Sep. 12, 2011 for U.S. Appl. No. 12/772,962.
Office Action dated Sep. 14, 2011 for U.S. Appl. No. 12/772,959.
Office Action dated Sep. 20, 2011 for U.S. Appl. No. 13/112,619.
Notice of Allowance dated Mar. 29, 2005 for U.S. Appl. No. 10/721,765.
Notice of Allowance dated Feb. 13, 2008 for U.S. Appl. No. 11/679,806.
Notice of Allowance dated May 30, 2003 for U.S. Appl. No. 10/273,238.
Notice of Allowance dated Nov. 3, 2009 for U.S. Appl. No. 12/149,931.
Notice of Allowance dated Dec. 30, 2009 for U.S. Appl. No. 12/149,931.
Office Action dated Sep. 28, 2007 for U.S. Appl. No. 11/679,806.
Office Action dated Nov. 30, 2009 for U.S. Appl. No. 12/149,935.
Office Action dated Sep. 13, 2004 for U.S. Appl. No. 10/721,765.
ISR/WO dated Aug. 15, 2008 for International Patent Application No. PCT/US2008/063301.
IPRP dated Nov. 10, 2009 for International Patent Application No. PCT/US2008/063301.
ISR/WO dated Aug. 20, 2008 for International Patent Application No. PCT/US2008/063236.
IPRP dated Nov. 17, 2009 for International Patent Application No. PCT/US2008/063236.
ISR/WO dated Oct. 24, 2008 for International Patent Application No. PCT/US2008/063336.
IPRP dated Nov. 17, 2009 for International Patent Application No. PCT/US2008/063336.
ISR/WO dated Aug. 15, 2008 for International Patent Application No. PCT/US2008/063287.
IPRP dated Nov. 10, 2009 for International Patent Application No. PCT/US2008/063287.
ISR/WO dated Nov. 10, 2009 for International Patent Application No. PCT/US2008/063268.
IPRP dated Nov. 10, 2009 for International Patent Application No. PCT/US2008/063268.
Technical Project Presentation—Development of a High-Performance Generator for Wind Turbines—by Andrzej M. Trzynadlowski, PhD, University of Nevada, Reno, FIEEE.
Technical Project Presentation—Development of a High-Performance Generator for Wind Turbines—Final Report—University of Nevada, Reno—Feb. 2004.
"Magnetic Field Calculation of Claw Pole Permanent Magnet Machines Using Magnetic Network Method", by Y.G. Guo et al., Faculty of Engineering, University of Technology, Sydney.
"Applications of Power Electronics in Automotive Power Generation",—by David J. Perreault et al., Laboratory for Electromagnetic and Electronic Systems, Massachusetts Institute of Technology, Jun. 21-22, 2006—Paris.
"Thermal Modeling of Lundell Alternators", IEEE Transactions on Energy Conversion, vol. 20, No. 1, Mar. 2005.
"Iron Loss Calculation in a Claw-Pole Structure", by A. Reinap et al., Lund University.
"Permanent Magnet Assisted Synchronous Reluctance Motor Design and Performance Improvement",—A Dissertation by Peyman Niazi, Texas A&M University, Dec. 2005.
"New Design of Hybrid-Type Self-Bearing Motor for Small, High-Speed Spindle",—by Hideki Kanebako et al., IEEE/ASME Transactions on Mechatronics, vol. 8, No. 1, Mar. 2003, retrieved Jan. 8, 2010.
"Evaluation of Rotor Conducting Screens on the Single-Phase Switched Reluctance Machine",—by M.M. Mahmoud et al., School of Engineering and Physical Sciences, Heriot-Watt University, Riccarton, Edinburgh, Scotland, United Kingdom, May 3, 2005.
"Analytical Interpretation and Quantification of Rotational Losses in Stator Cores of Induction Motors",—IEEE Transactions on Magnetics, vol. 43, No. 10, Oct. 2007, retrieved Jan. 8, 2010.
Hasubek, B.E. et al.; "Design Limitations of Reduced Magnet Material Passive Rotor Transverse Flux Motors Investigated Using 3D Finite Element Analysis"; 2000; pp. 365-369, retrieved Oct. 24, 2008.
Dubois, Maxine R. et al.; "Clawpole Transverse-Flux Machine with Hybrid Stator"; pp. 1-6.
Henneberger, G. et al.; "On the Parameters Computation of a Single Sided Transverse Flux Motor"; Workshop on Electrical Machines' Parameters, Technical University of Cluj-Napoca, May 26, 2001; pp. 35-40.
Woolmer, MD, T.J., et al., "Analysis of the Yokeless and Segmented Armature Machine", Electric Machines & Drives Conference, 2007. IEMDC apos; 07. IEEE International, May 3-5, 2007, pp. 704-708, vol. 1, Oxford University, Engineering Department, Parks Road, Oxford, UK.
Husband, S.M. et al.; "The Rolls-Royce Transverse Flux Motor Development"; Electric Machines and Drives Conference, vol. 3, pp. 1435-1440, IEEE, 2003.
Theory of SR Motor Operation (Power Point Presentation), copyright 2002 by George Holling and Rocky Mountain Technologies Inc.
Development of a PM Transverse Flux Motor With Soft Magnetic Composite Core—IEEE Transactions on Energy Conversion, vol. 21, No. 2., Jun. 2006.
Fundamental Modeling for Optimal Design of Transverse Flux Motors—Genevieve Patterson et al., University of Tokyo.
www.higenmotor.com/eng/aboutus/about06read.asp?id=notice&no=87 dated Jan. 15, 2010.
Lyng Eltorque QT 800—2.0 User Manual, version 1.0—dated Jul. 3, 2007.
Motors: Emerging Concepts by George Holling, Apr. 2007.
www.iem.rwth-aachen.de/index.pl/new materials and machines?makePrintable=1; retrieved Jan. 15, 2010.
Raser Technologies Company Brochure.
Response to Office Action filed Jan. 15, 2010 for Japanese Patent Application No. JPPA-2003-548374.
Office Action dated Mar. 2, 2010 for U.S. Appl. No. 12/149,931.
Restriction Requirement dated Apr. 5, 2010 for U.S. Appl. No. 12/149,934.
Restriction Requirement dated Apr. 22, 2010 for U.S. Appl. No. 12/149,936.
Office Action dated Apr. 28, 2010 for U.S. Appl. No. 12/149,935.
Notice of Allowance dated May 4, 2010 for U.S. Appl. No. 12/149,931.

* cited by examiner

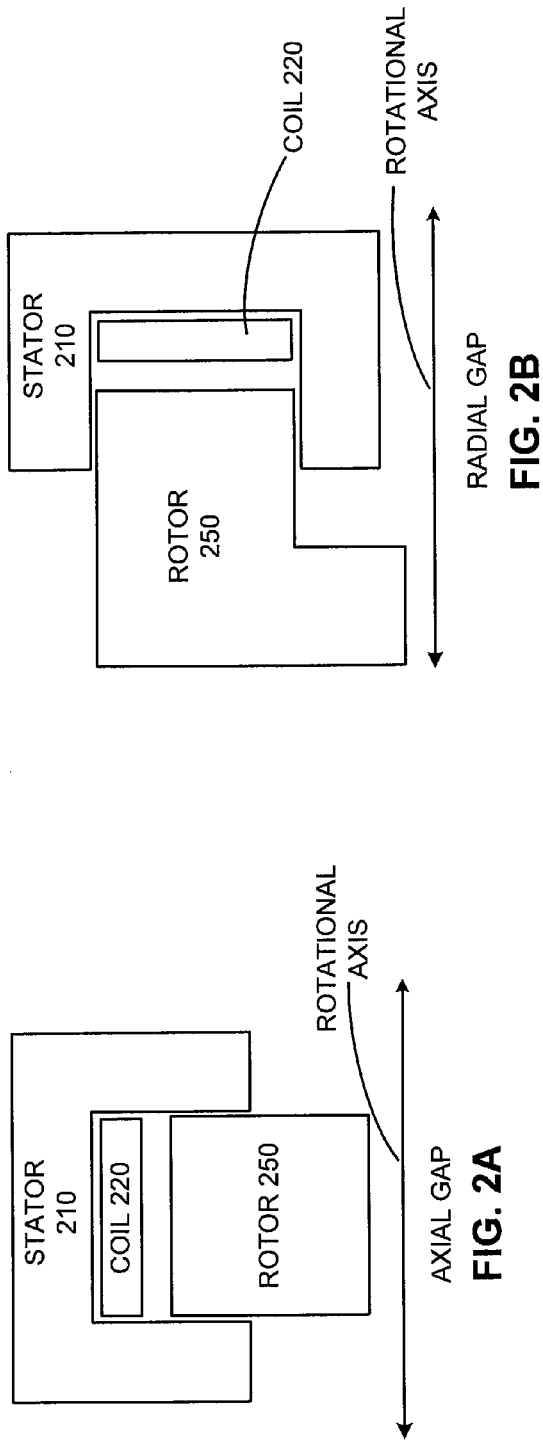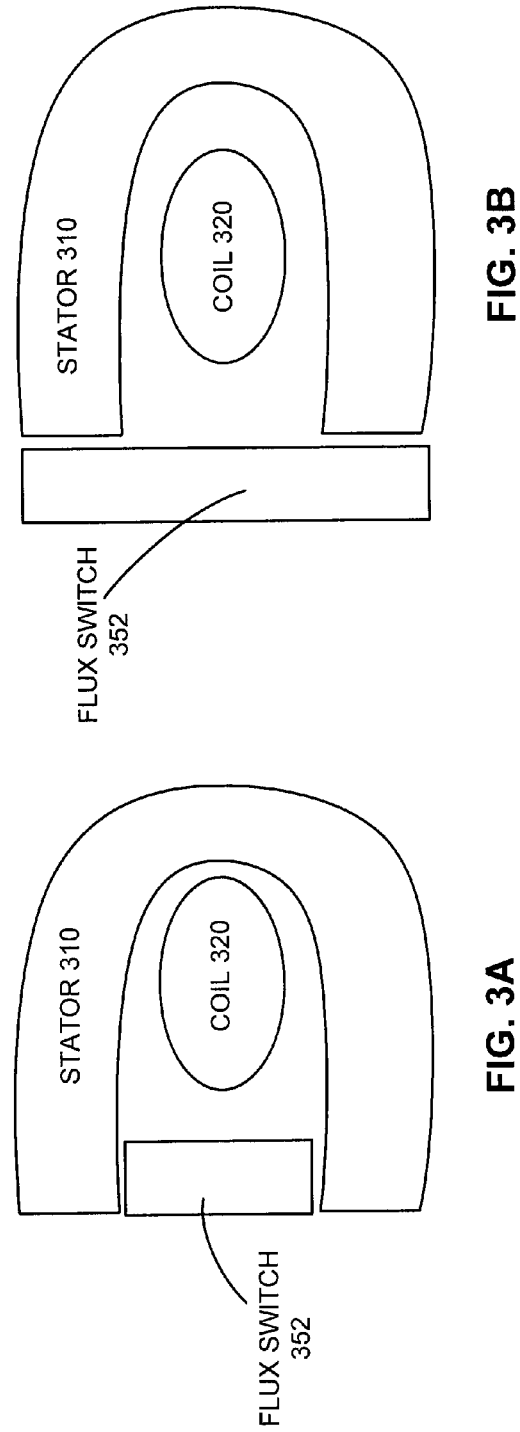

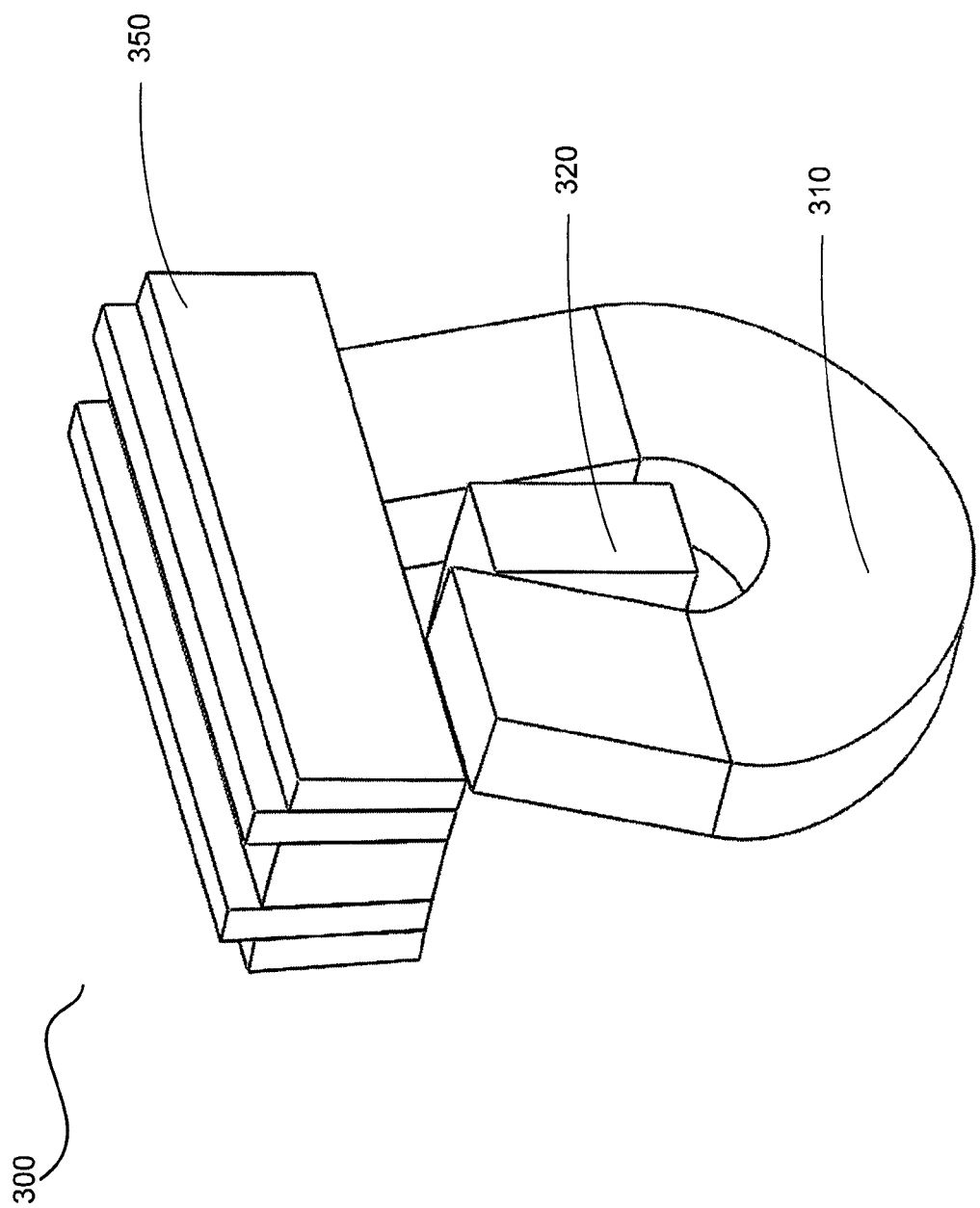

TRANSVERSE AND/OR COMMUTATED FLUX SYSTEMS FOR ELECTRIC BICYCLES

CROSS REFERENCE TO RELATED APPLICATIONS

This application is a non-provisional of U.S. Provisional No. 61/314,109 filed on Mar. 15, 2010 and entitled "TRANSVERSE AND/OR COMMUTATED FLUX SYSTEMS FOR ELECTRIC BICYCLES." The entire contents of the foregoing application are hereby incorporated by reference.

TECHNICAL FIELD

The present disclosure relates to electrical systems, and in particular to transverse flux machines and commutated flux machines.

BACKGROUND

Electric bicycles ("e-bikes") and other light electric vehicles ("LEVs"), for example electric scooters, motorcycles, golf carts, and/or the like, continue to increase in popularity. Such devices provide convenient transportation, particularly in congested urban areas. Many prior approaches to electric motors and/or generators in e-bikes have been attempted. However, performance of such motors, generators, and/or vehicles is often limited. Consequently, the range, power, and efficiency of the e-bike may be less than desired. It remains desirable to provide improved electric motors in e-bikes, for example electric motors configured as transverse flux machines and/or commutated flux machines.

SUMMARY

This disclosure relates to systems and methods for electric motors in light electric vehicles, for example e-bikes. In an exemplary embodiment, an electrical machine comprises: a rotor, a stator, and a coil, wherein at least one of the rotor or the stator is coupled to the wheel of an electric bicycle. The electrical machine is at least one of a transverse flux machine or a commutated flux machine.

In another exemplary embodiment, a hub motor for an e-bike comprises: a coil, a stator at least partially surrounding the coil, wherein the stator comprises a plurality of flux switches, and a rotor comprising a set of magnets interleaved with a set of flux concentrators. At least one of the magnets in the set of magnets is extended in a direction away from the coil to a distance greater than an adjacent flux concentrator of the set of flux concentrators. The hub motor is at least one of a transverse flux machine or a commutated flux machine.

In another exemplary embodiment, a method of making a rotor assembly for an electrical machine comprises: forming, from powdered metal, a gear having teeth thereon; coupling to the gear, in spaces between the gear teeth, a plurality of magnets in an alternating manner; forming a rotor ring by removing, from the gear, at least a portion of the powdered metal comprising the gear to separate the gear teeth from one another; and coupling the rotor ring to a structural component in order to form a rotor assembly.

In another exemplary embodiment, a cassette motor for an e-bike comprises: a coil; a stator at least partially surrounding the coil, wherein the stator comprises a plurality of flux switches; and a rotor comprising a set of magnets interleaved with a set of flux concentrators. The cassette motor is interchangeable with a gear cassette. The cassette motor is at least one of a transverse flux machine or a commutated flux machine.

In another exemplary embodiment, a method of converting a bicycle to electric operation comprises: removing, via a cassette tool, a gear cassette from the bicycle, coupling a cassette motor to the bicycle in place of the gear cassette, and coupling the cassette motor to a motor controller.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

FIG. 2A illustrates an exemplary axial gap configuration in accordance with an exemplary embodiment;

FIG. 2B illustrates an exemplary radial gap configuration in accordance with an exemplary embodiment;

FIG. 3A illustrates an exemplary cavity engaged configuration in accordance with an exemplary embodiment;

FIG. 3B illustrates an exemplary face engaged configuration in accordance with an exemplary embodiment;

FIG. 3C illustrates an exemplary face engaged transverse flux configuration in accordance with an exemplary embodiment;

DETAILED DESCRIPTION

Figure 1B:
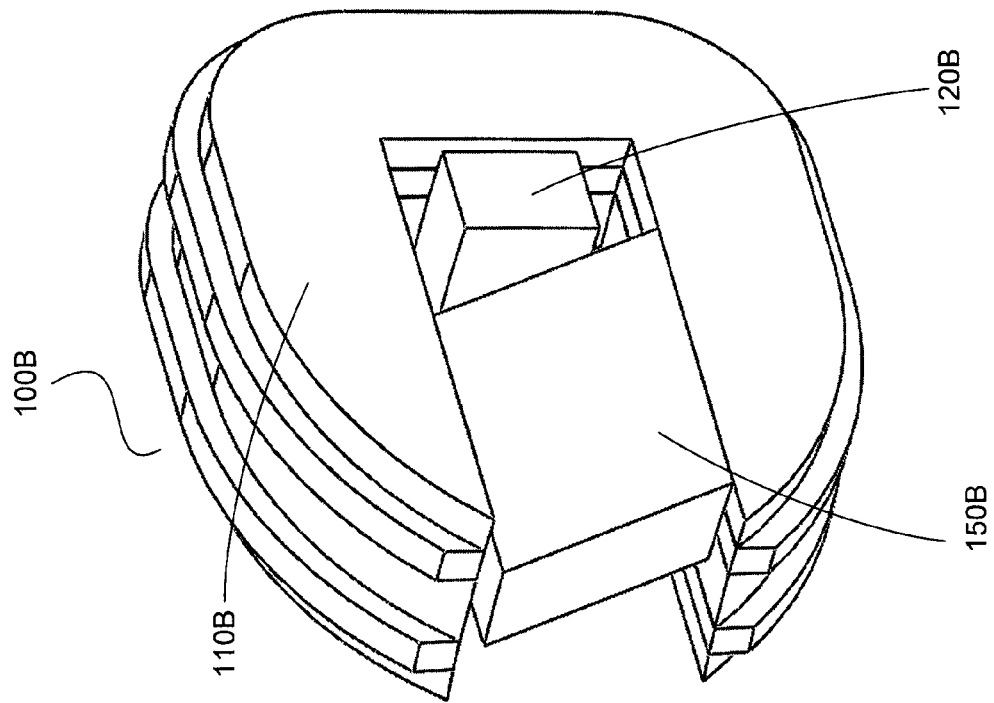
FIG. 1B illustrates an exemplary commutated flux machine in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for electrical system construction, management, operation, measurement, optimization, and/or control, as well as conventional techniques for electric bicycle construction, configuration, and utilization, and also magnetic flux utilization, concentration, control, and/or management, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical electrical system, for example an electrical motor in an e-bike.

Prior e-bike motors, for example brushless DC motors, synchronous AC motors, and/or the like, may suffer from various deficiencies. For example, many prior electric motors and associated motor controllers have combined efficiencies of only up to about 80%. Additionally, the efficiency may fall off sharply as torque output and/or RPM increases. Thus, range of an associated e-bike is reduced, due to the power lost to inefficiencies of the system. Additionally, such motors often offer only limited power output in order to maintain efficiency, resulting in reduced performance under demanding loads such as hill climbing.

Moreover, many prior e-bike motors have had cogging torque waveforms having peak magnitudes in excess of 2 Newton-meters. Additionally, many prior e-bike motors have had cogging torque waveforms having peak magnitudes in excess of one-tenth (1/10) the output torque of the e-bike motor. Such configurations often result in undesirable operating noise, vibration, and/or wear.

Yet further, many prior electric motors have offered limited torque density. As used herein, "torque density" refers to Newton-meters of torque produced per kilogram of active electrical and magnetic materials in the motor. For example, many prior electric motors are configured with a torque density between about 0.5 Newton-meters per kilogram and about 3 Newton-meters per kilogram. Consequently, a motor of sufficient torque and/or power for a particular application may be difficult or even impossible to fit in the available area, for example when a motor sized to produce sufficient torque becomes too massive to fit in a confined space. In the case of e-bikes, the associated space constraints (for example, the limited space available in a bicycle wheel hub) often result in inclusion of comparatively underpowered and/or overweight motors, for example motors having a maximum power output of about 500 to about 900 watts.

In contrast, efficient, compact, and/or torque-dense electric motors for e-bikes and other LEVs may be achieved by utilizing a transverse flux machine and/or commutated flux machine configured in accordance with principles of the present disclosure. As used herein, a "transverse flux machine" and/or "commutated flux machine" may be any electrical machine wherein magnetic flux paths have sections where the flux is generally transverse to a rotational plane of the machine. In an exemplary embodiment, when a magnet and/or flux concentrating components are on a rotor and/or are moved as the electrical machine operates, the electrical machine may be a pure "transverse" flux machine. In another exemplary embodiment, when a magnet and/or flux concentrating components are on a stator and/or are held stationary as the electrical machine operates, the electrical machine may be a pure "commutated" flux machine. As is readily apparent, in certain configurations a "transverse flux machine" may be considered to be a "commutated flux machine" by fixing the rotor and moving the stator, and vice versa. Moreover, a coil may be fixed to a stator; alternatively, a coil may be fixed to a rotor.

Moreover, there is a spectrum of functionality and device designs bridging the gap between a commutated flux machine and a transverse flux machine. Certain designs may rightly fall between these two categories, or be considered to belong to both simultaneously. Therefore, as will be apparent to one skilled in the art, in this disclosure a reference to a "transverse flux machine" may be equally applicable to a "commutated flux machine" and vice versa.

Figure 1A:
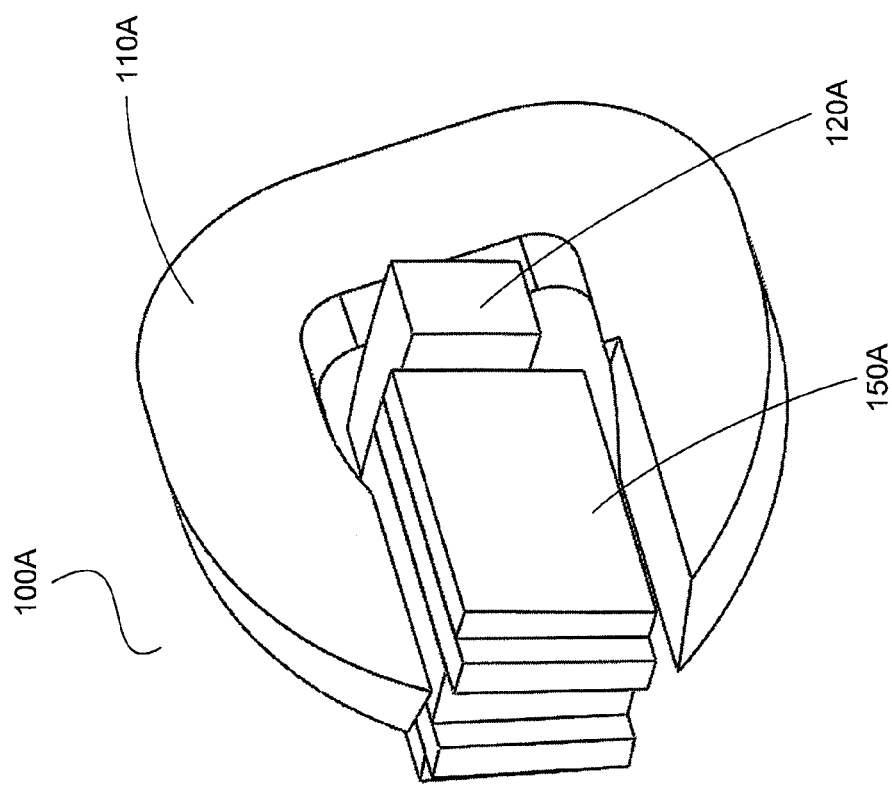
FIG. 1A illustrates an exemplary transverse flux machine in accordance with an exemplary embodiment.

In accordance with an exemplary embodiment, and with reference to FIG. 1A, an electrical machine, for example transverse flux machine (TFM) 100A, generally comprises a rotor 150A, a stator 110A, and a coil 120A. Rotor 150A comprises a plurality of interleaved magnets 154 and flux concentrators 152. Rotor 150A is configured to interact with stator 110A in order to facilitate switching of magnetic flux. Stator 110A is configured to be magnetically coupled to rotor 150A, and is configured to facilitate flow of magnetic flux via interaction with rotor 150A. Stator 110A at least partially encloses coil 120A. Coil 120A is configured to generate a current output responsive to flux switching and/or accept a current input configured to drive rotor 150A. Transverse flux machine 100A may also comprise various structural components, for example components configured to facilitate operation of transverse flux machine 100A. Moreover, transverse flux machine 100A may comprise any suitable components configured to support, guide, modify, and/or otherwise manage and/or control operation of transverse flux machine 100A and/or components thereof.

In accordance with an exemplary embodiment, and with reference to FIG. 1B, an electrical machine, for example commutated flux machine (CFM) 100B, generally comprises a stator 110B, a rotor 150B, and a coil 120B. Stator 110B comprises a plurality of interleaved magnets 114 and flux concentrators 112. Stator 110B at least partially encloses coil 120B. Stator 110B is configured to interact with rotor 150B in order to facilitate switching of magnetic flux. Stator 110B is configured to be magnetically coupled to rotor 150B, and is configured to facilitate flow of magnetic flux via interaction with rotor 150B. Coil 120B is configured to generate a current output responsive to flux switching and/or accept a current input configured to drive rotor 150B. Commutated flux machine 100B may also comprise various structural components, for example components configured to facilitate operation of commutated flux machine 100B. Moreover, commutated flux machine 100B may comprise any suitable components configured to support, guide, modify, and/or otherwise manage and/or control operation of commutated flux machine 100B and/or components thereof.

Moreover, transverse flux machines and/or commutated flux machines may be configured in multiple ways. For example, with reference to FIG. 2A, a commutated flux machine may be configured with a stator 210 at least partially surrounding a coil 220 and generally aligned with the rotational plane of a rotor 250. Such a configuration is referred to herein as "axial gap." In another configuration, with reference to FIG. 2B, a commutated flux machine may be configured with stator 210 rotated about 90 degrees with respect to the rotational plane of rotor 250. Such a configuration is referred to herein as "radial gap."

With reference now to FIG. 3A, a flux switch 352 in a commutated flux machine may engage a stator 310 at least partially surrounding a coil 320 by extending at least partially into a cavity defined by stator 310. Such a configuration is referred to herein as "cavity engaged." Turning to FIG. 3B, flux switch 352 in a commutated flux machine may engage stator 310 by closely approaching two terminal faces of stator 310. Such a configuration is referred to herein as "face engaged." Similar engagement approaches may be followed in transverse flux machines and are referred to in a similar manner. In general, it should be noted that a particular electrical machine may be face engaged or cavity engaged, and may be an axial gap or radial gap configuration. For example, in an exemplary embodiment, with reference to FIG. 3C, a transverse flux machine 300 comprises a coil 320 at least partially surrounded by stator 310. Stator 310 is face engaged with rotor 350 in an axial gap configuration.

Figure 4A:
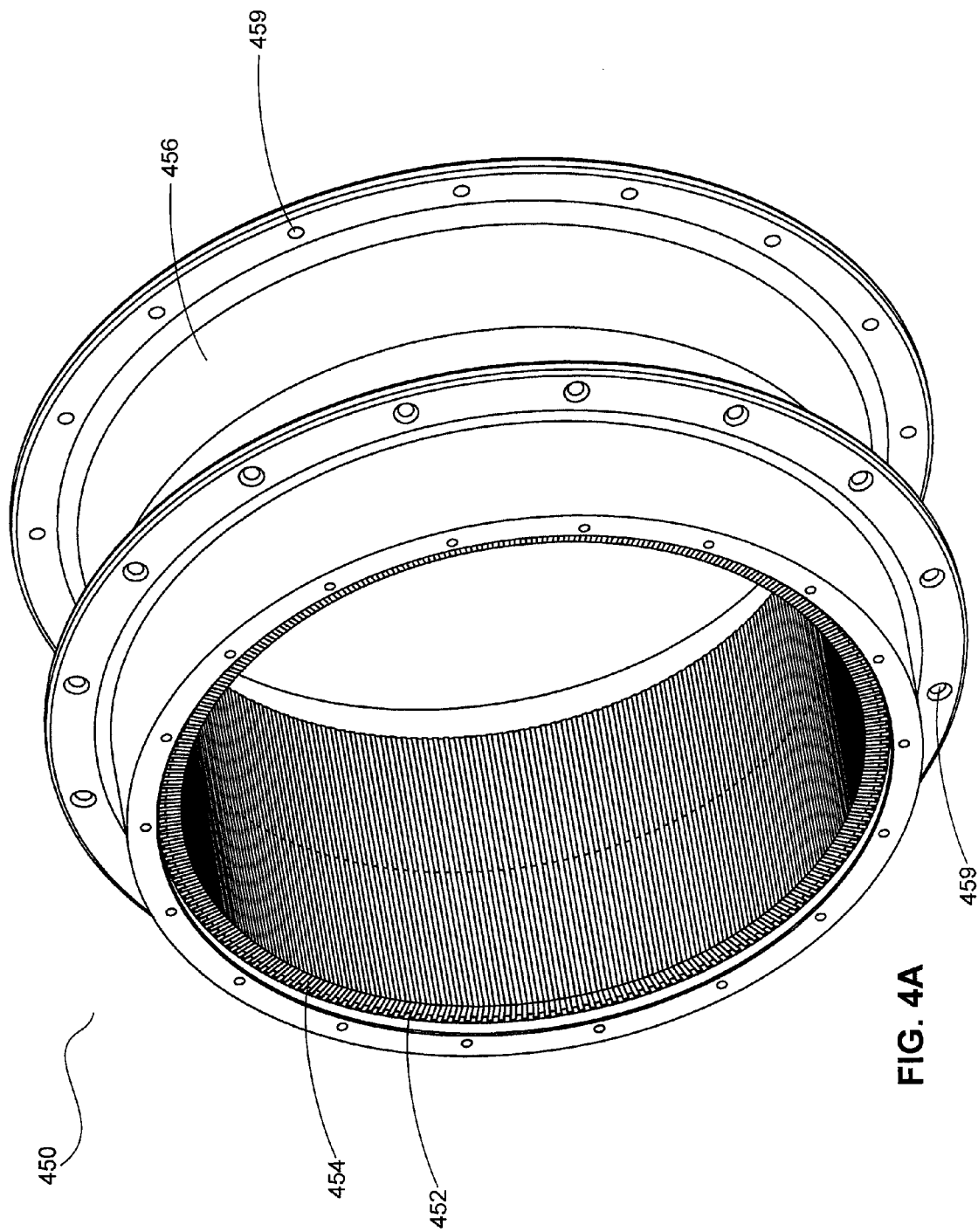
FIG. 4A illustrates an exemplary rotor assembly in accordance with an exemplary embodiment.
Figure 4B:
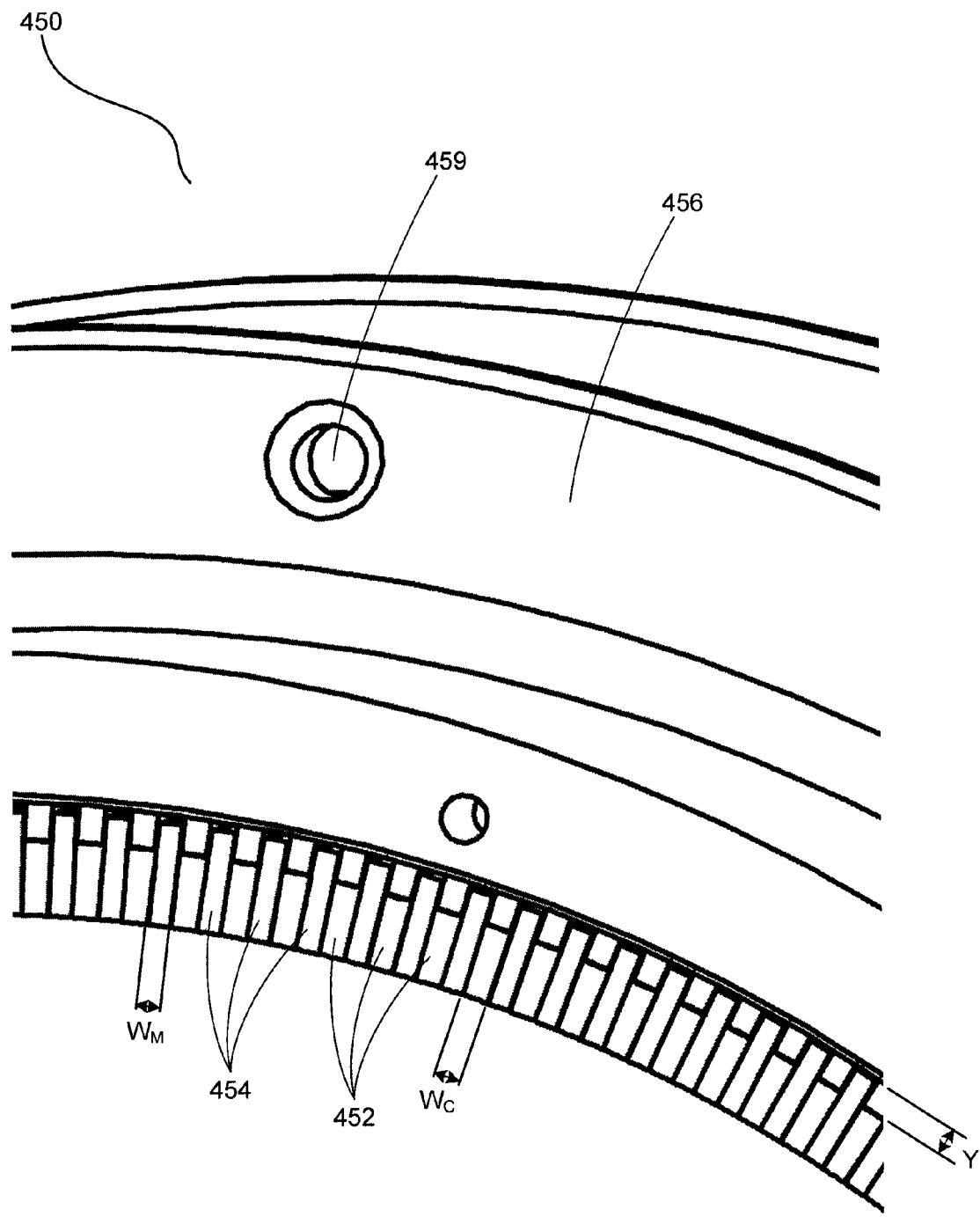
FIG. 4B illustrates a close-up view of a portion of an exemplary rotor assembly in accordance with an exemplary embodiment.

In accordance with various exemplary embodiments, with reference now to FIGS. 4A and 4B, a rotor assembly 450 for a transverse flux machine comprises a generally ring-shaped rotor body 456. In an exemplary embodiment, rotor body 456 comprises spoke holes 459 therein. Rotor assembly 450 further comprises a plurality of magnets 454 and flux concentrators 452. Magnets 454 may comprise rare earth permanent magnets (for example, neodymium-iron-boron (NIB) material), and/or any other suitable magnetic material. Flux concentrators 452 may comprise silicon steel, powdered metals, plated powdered metals, soft magnetic composites, amorphous metals, nanocrystalline composites, iron cobalt alloys, and/or the like and/or combinations of the same.

The magnets 454 and flux concentrators 452 may be arranged in an alternating fashion. In one exemplary embodiment, magnets 454 are magnetically oriented in alternating directions while interleaving with flux concentrators 452. Stated another way, magnets 454 may be arranged so that a north magnetic side of a particular magnet 454 is directed toward a north magnetic side of another magnet 454, with a flux concentrator 452 therebetween. Likewise, a south magnetic side may be oriented toward another south magnetic side, separated by a flux concentrator 452. Thus, in an exemplary embodiment, magnets 454 are oriented and combined with flux concentrators 452 such that each flux concentrator 452 has a net magnetic pole. Moreover, magnets 454 may be mounted, joined, linked, arranged, coupled, and/or otherwise configured in any suitable manner and/or fashion, for example surface mounted and/or the like.

With reference to FIG. 4B, in various exemplary embodiments, magnets 454 may be at least partially "extended" a distance Y beyond corresponding surfaces of flux concentrators 452. In this manner, flux leakage between adjacent flux concentrators 452 may be reduced, as the extended portion of magnets 454 at least partially "shield" adjacent flux concentrators 452 from one another. Magnets 454 may be extended in any suitable direction and by any suitable distance, as desired. In various exemplary embodiments, magnets 454 are extended beyond flux concentrators 452 by a distance of between about 1 mm to about 4 mm. Additional details regarding extended magnets are disclosed in U.S. patent application Ser. No. 12/772,958 filed on May 3, 2010, now U.S. Patent Application Publication No. 2011/0169365 entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING", the contents of which are hereby incorporated by reference in their entirety.

In an exemplary embodiment, with reference to FIGS. 4A and 4B, magnets 454 and flux concentrators 452 are disposed along an inner circumference of rotor assembly 450. In another exemplary embodiment, magnets 454 and flux concentrators 452 are disposed along an outer circumference of rotor assembly 450. Rotor assembly 450 may be configured with any suitable number of magnets 454 and/or flux concentrators 452. Rotor body 456 at least partially contains, surrounds, and/or otherwise provides structural support and/or ease of assembly to a plurality of magnets 454 and flux concentrators 452.

In various exemplary embodiments, rotor assembly 450 is configured with a high pole count (e.g., the total number of magnetic north and south poles), for example a pole count in excess of 50 when rotor assembly has an outer diameter of about 5 inches. In an exemplary embodiment, rotor assembly 450 is configured with 50 magnets 454 and 50 flux concentrators 452. In another exemplary embodiment, rotor assembly 450 is configured with 100 magnets 454 and 100 flux concentrators 452. In another exemplary embodiment, rotor assembly 450 is configured with 200 magnets 454 and 200 flux concentrators 452. In yet other exemplary embodiments, rotor assembly 450 is configured with more than 250 magnets 454 and more than 250 flux concentrators 452. Moreover, rotor assembly 450 may be configured with any suitable pole count, and may be configured with any suitable number of magnets 454 and/or flux concentrators 452.

In various exemplary embodiments, rotor body 456 comprises aluminum. In other exemplary embodiments, rotor body 456 comprises a polymeric composite. Moreover, rotor body 456 may comprise any suitable material configured to provide structural strength to rotor assembly 450. Any suitable number of spoke holes 459 or other mounting components may be located on and/or in rotor body 456 or elsewhere in rotor assembly 450, for example in order to allow rotor assembly 450 to be coupled to an e-bike wheel via a plurality of metal spokes.

Rotor assembly 450 may be sized, shaped, and/or otherwise configured to be coupled to an e-bike or other PEV. In various exemplary embodiments, rotor assembly 450 is generally cylindrical. In certain exemplary embodiments, rotor assembly 450 is configured to act as and/or be disposed within the wheel hub of an e-bike. In an exemplary embodiment, rotor assembly 450 has an outer diameter of about 5 inches, an inner diameter of about 4 inches, and a width of about 2 inches. In other exemplary embodiments, rotor assembly 450 has an outer diameter of between about 3 inches and about 12 inches, an inner diameter of between about 2 inches and about 11 inches, and a width of between about 1 inch and about 6 inches. Moreover, rotor assembly 450 may be configured with a smaller and/or larger inner diameter, outer diameter, width, and/or other dimensions, as suitable.

In various exemplary embodiments, rotor assembly 450 is configured to not interfere with brake calipers of an e-bike.

Stated another way, rotor assembly 450 is sized and/or shaped in such a manner that an existing e-bike brake disc and caliper may be utilized in connection with rotor assembly 450. For example, rotor assembly 450 may be configured to extend a radial distance from the axis of rotation a distance smaller than the closest radial distance of a brake caliper. In one exemplary embodiment, rotor assembly 450 is configured to be coupled to and compatible with a 180 mm brake disc without interfering with operation of a corresponding brake caliper.

With continued reference to FIG. 4B, in various exemplary embodiments, in addition to being configured with a high pole count (for example, a pole count in excess of 50), rotor assembly 450 may be configured with a fine pole pitch. For example, in an exemplary embodiment, magnets 454 are configured with a width $W_M$ of about 0.031" (0.787 millimeters), and flux concentrators 452 are configured with a width $W_C$ of about 0.035" (0.889 millimeters). In other exemplary embodiments, magnets 454 are configured with a width $W_M$ of between about 0.031" (0.787 millimeters) and about 0.080" (2.03 millimeters), and flux concentrators 452 are configured with a width $W_C$ of between about 0.0315" (0.8 millimeters) and about 0.315" (8.0 millimeters). Thus, rotor assembly 450 may be configured with a fine pole pitch, for example a pole pitch of less than 7.2 degrees, even though the diameter of rotor assembly 450 may be small, for example less than 6 inches.

In general, rotor assembly 450 may be configured with a higher pole count and/or a finer pole pitch as the diameter of rotor assembly 450 increases and/or as the thickness of magnets 454 and/or flux concentrators 452 decreases. In one example, rotor assembly 450 having an inner diameter of 4 inches is configured with 100 magnets 454 and 100 flux concentrators, resulting in a pole count of 100, and a pole pitch of (360/100)=3.6 degrees. In another example, rotor assembly 450 having an inner diameter of 4 inches is configured with 200 magnets 454 and 200 flux concentrators 452, resulting in a pole count of 200, and a pole pitch of (360/200)=1.8 degrees. In various exemplary embodiments, rotor assembly 450 is configured with a pole pitch of less than 7.2 degrees at a diameter of rotor assembly 450 of less than 6 inches.

Due in part to the high pole count and/or fine pole pitch of rotor assembly 450 at a particular diameter, transverse flux machine 400 may be configured with a high torque density, for example a torque density in excess of 30 Newton-meters per kilogram of active magnetic and electrical materials. In various exemplary embodiments, transverse flux machine 400 is configured with a continuous, thermally stable torque density between about 5 Newton-meters per kilogram to about 50 Newton-meters per kilogram. In certain exemplary embodiments, transverse flux machine 400 is configured with a continuous, thermally stable torque density between about 10 Newton-meters per kilogram and about 20 Newton-meters per kilogram. In an exemplary embodiment, transverse flux machine 400 is configured with a continuous, thermally stable torque density of about 18 Newton-meters per kilogram.

In various exemplary embodiments, transverse flux machine 400 is configured to operate over an RPM range from about 0 RPM to about 300 RPM. In certain exemplary embodiments, transverse flux machine 400 is configured to operate over an RPM range from about 0 RPM to about 1000 RPM. In other exemplary embodiments, transverse flux machine 400 is configured to operate over an RPM range from about 0 RPM to about 2000 RPM.

Figure 4C:
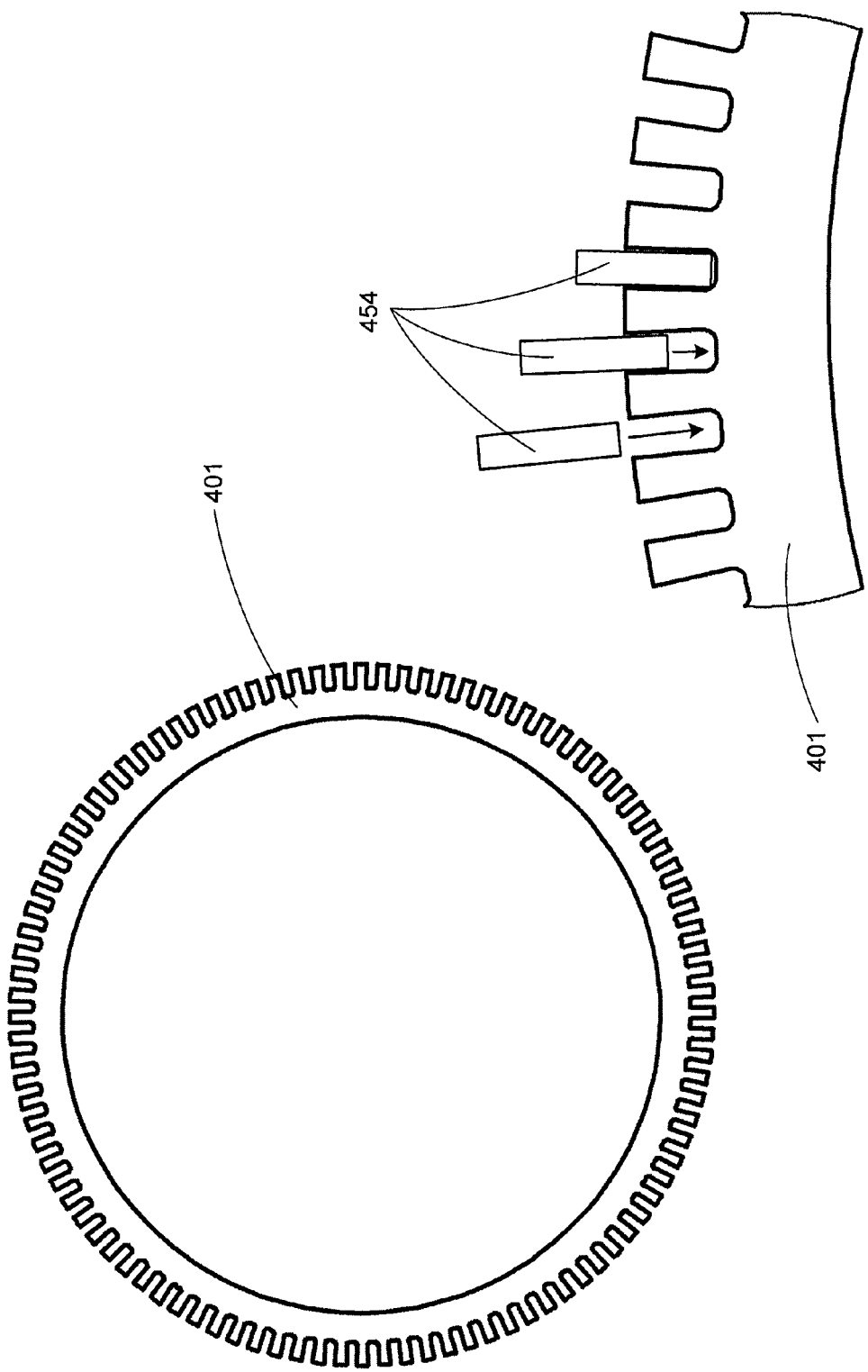
FIG. 4C illustrates an approach for coupling magnets and flux concentrators in a rotor assembly in accordance with an exemplary embodiment.

Turning now to FIG. 4C, in accordance with various exemplary embodiments, a method of constructing rotor assembly 450 is described. In an exemplary embodiment, a "gear" 401 is created from a suitable material, for example powdered metal. Powdered metal is desirable due to the ability to be precisely formed and to handle fine tolerances, for example tolerances as tight as about 1/1000 (0.001) inch. However, any suitable materials and/or tolerances may be used. Gear 401 may be molded, pressed, sintered, and/or otherwise bonded, formed, and/or shaped from powdered metal as is known in the art.

In various exemplary embodiments, gear 401 is configured with a generally circular shape having a number N of outer gear "teeth". Generally speaking, the number N of gear teeth will be the number of flux concentrators 452 in rotor assembly 450, the width of a gear tooth will be the width of a flux concentrator 452, and the height of a gear tooth will be greater than or equal to the height of a flux concentrator 452. Portions of the "teeth" of gear 401 will eventually become flux concentrators 452. The teeth of gear 401 may be tapered, angled, curved, and/or otherwise shaped, as desired. Gear 401 is configured to have a suitable inner diameter, outer diameter, thickness, tooth spacing, and/or other dimensions and configurations.

Once gear 401 is prepared, magnets 454 are inserted into the slots between the teeth of gear 401 in an alternating manner. The teeth of gear 401 are thus each configured with a net magnetic pole. The resulting assembly may be dipped in epoxy or other suitable adhesive and/or structural material in order to fix magnets 454 in place. Moreover, magnets 454 may be coupled to and/or fixed in place with respect to the teeth of gear 401 in any suitable manner.

Once magnets 454 are secured in place, a portion of gear 401 may be removed in order to leave behind only magnets 454 with the "teeth" of gear 401 (now flux concentrators 452) therebetween. For example, in an exemplary embodiment a lathe or other suitable rotary tool is utilized to machine away one or more of an inner portion, an outer portion, a top portion, or a bottom portion of gear 401 and/or magnets 454. A suitable amount of material may be removed in order to create a desired inner diameter, outer diameter and/or other configuration and/or geometry. In one exemplary embodiment, the inner portion of gear 401 is removed as far as the inner edge of magnets 454. In another exemplary embodiment, the inner portion of gear 401 is removed slightly beyond the inner edge of magnets 454 (for example, between about 0.01 inches and about 0.1 inches), such that at least a small portion of each magnet 454 is removed. In yet another exemplary embodiment, a top portion of magnets 454 and gear 401 and an inner portion of magnets 454 and gear 401 are removed. In this manner, flux concentrators 452 and magnets 454 are configured as desired, for example, according to a desired air gap with a stator, an intended face engaged configuration, an intended radial gap configuration, an intended axial gap configuration, and/or the like.

Once a suitable portion of gear 401 and/or magnets 454 have been removed, debris may be removed from the remaining magnets 454 and/or flux concentrators 452, for example via compressed air. The resulting generally ring-shaped series of alternating magnets 454 and flux concentrators 452 may be coupled to a supporting structure, for example a portion of a rotor, a portion of a stator, and/or the like. In various exemplary embodiments, the supporting structure, for example rotor body 456, may be shaped to enable a desired configuration of rotor assembly 450.

In certain exemplary embodiments, the magnets 454 and flux concentrators 452 are inserted within a corresponding cylindrical cavity in rotor body 456 (in configurations where a stator is located generally within rotor body 456). In other exemplary embodiments, the magnets 454 and flux concentrators 452 are disposed over a corresponding generally cylindrical extension of rotor body 456 (in configurations where a stator is located generally without rotor body 456). In yet other exemplary embodiments, the magnets 454 and flux concentrators 452 may be coupled to rotor body 456 and at least partially extend beyond rotor body 456 in a direction parallel to the axis of rotation of rotor body 456 (for example, in order to support a radial gap configuration).

The magnets 454 and flux concentrators 452 may be secured to rotor body 456, as desired, in order to form rotor assembly 450. Magnets 454 and flux concentrators 452 may be glued, welded, screwed, bolted, press fitted, stamped, and/or otherwise secured to rotor body 456 in any suitable manner in order to form rotor assembly 450. In various exemplary embodiments, rotor assembly 450 is coupled to stator assembly 410 in order to provide an operational transverse flux machine 400.

Figure 5A:
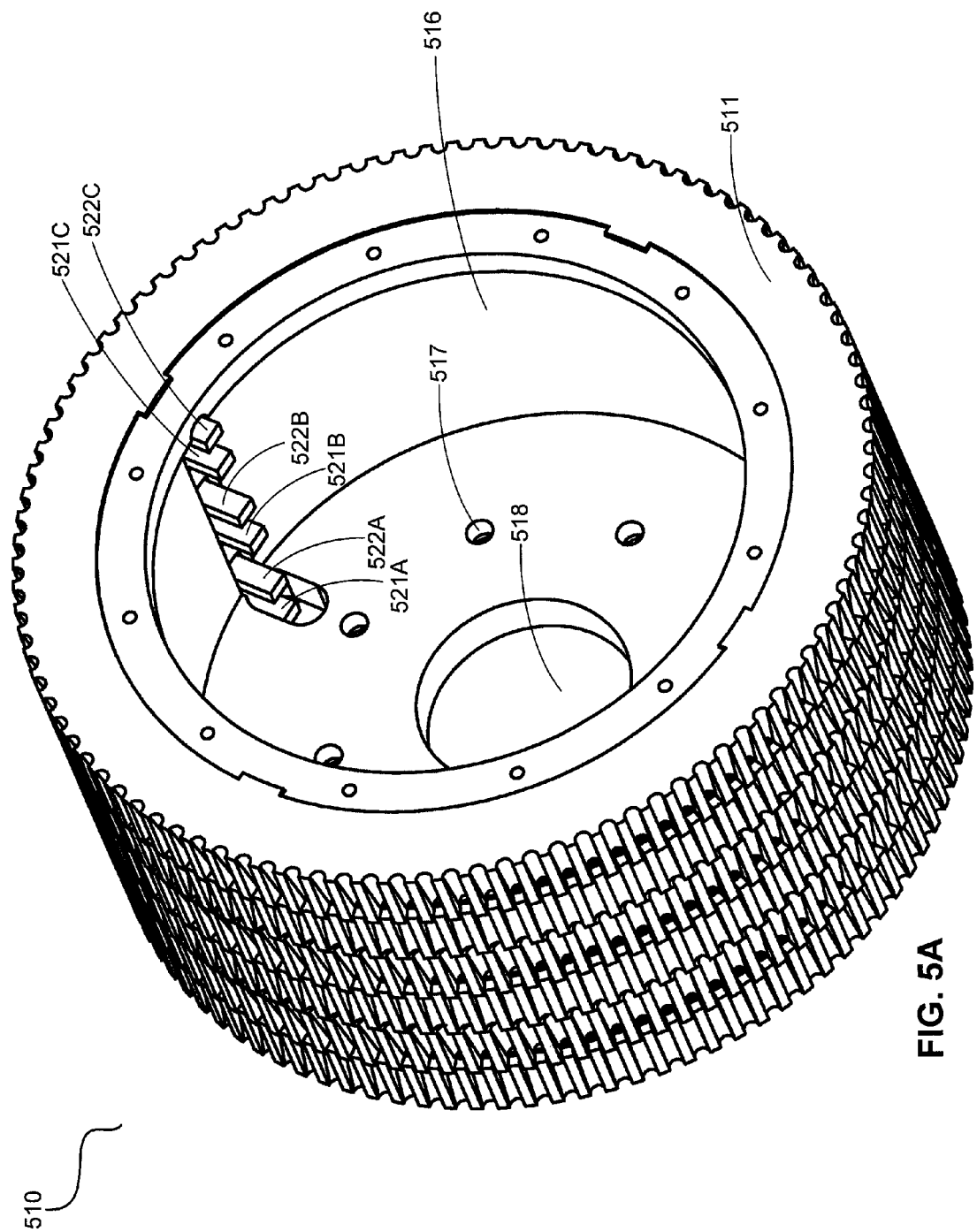
FIG. 5A illustrates an exemplary polyphase stator assembly in accordance with an exemplary embodiment.
Figure 5B:
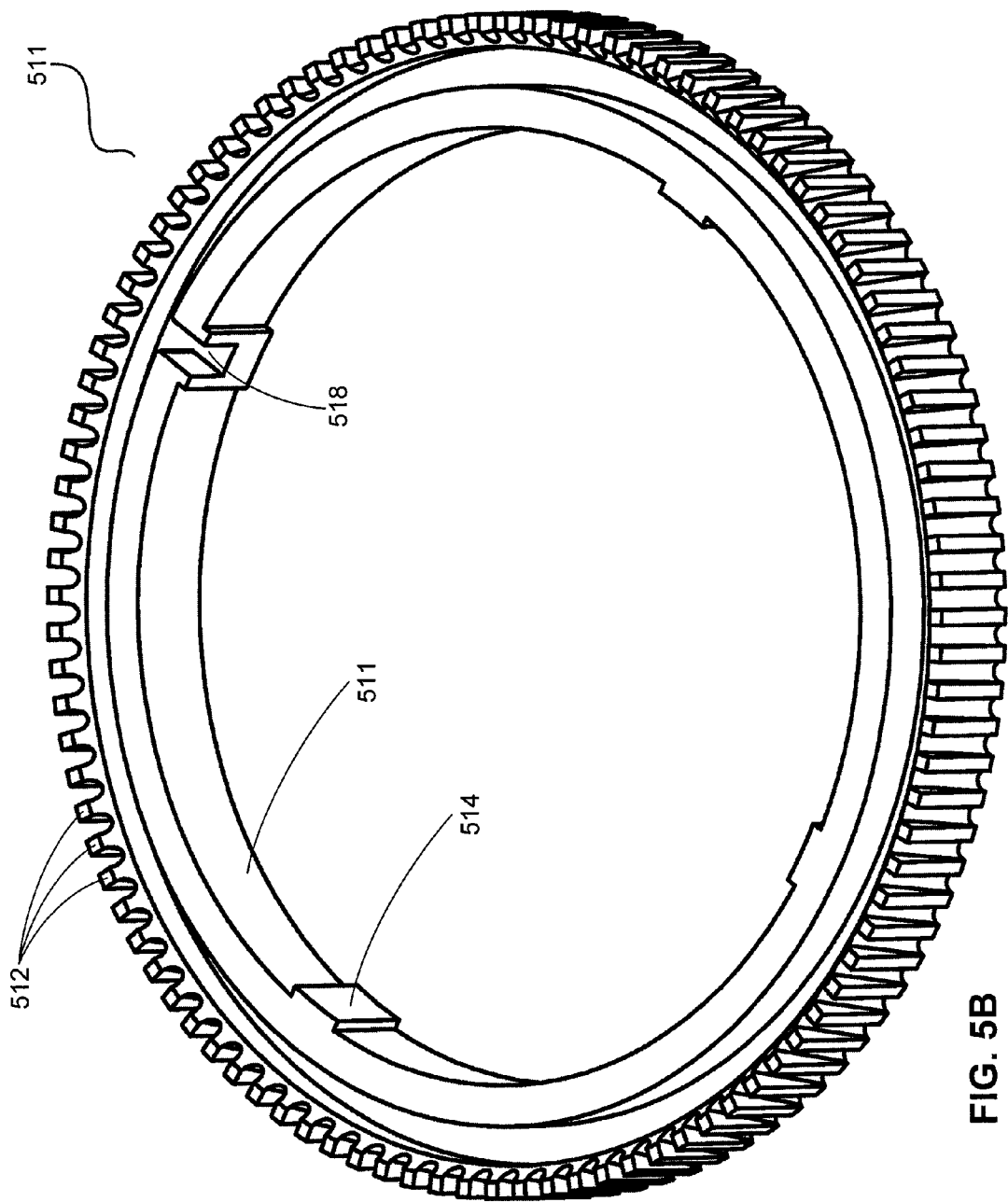
FIG. 5B illustrates an exemplary stator portion in accordance with an exemplary embodiment.

Turning now to FIG. 5A, in accordance with an exemplary embodiment stator assembly 510 comprises stator body 516 having one or more stator phase portions 511 coupled thereto. Stator body 516 may comprise aluminum, composite, and/or any other suitable material configured to provide structural stability to stator assembly 510. Stator phase portions 511 at least partially enclose one or more coils. In an exemplary embodiment, the ends 521, 522 of three coils (shown as 521A, 522A, 521B, 522B, 521C, and 522C) extend at least partially through stator body 516 in order to facilitate an electrical connection to the respective coils. In this manner, energizing current may be provided to the coils, and/or induced current may be received from the coils. With reference now to FIGS. 5A and 5B, in accordance with an exemplary embodiment a stator phase portion 511 comprises a generally ring-shaped structure having a set of stator "teeth" 512. In a transverse flux machine, at least part of stator phase portion 511 is configured to act as a flux switch for a rotor. For example, one or more teeth 512 of the set of stator teeth, or portions thereof, may each act as a flux switch. Additional details regarding rotor and/or stator teeth and configurations therefor are disclosed in U.S. patent application Ser. No. 12/772,958 filed on May 3, 2010, now U.S. Patent Application Publication No. 2011/0169365 entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING" and U.S. patent application Ser. No. 12/772,962 filed on May 3, 2010, now U.S. Patent Application Publication No. 2011/0169366 entitled "TRANSVERSE AND/OR COMMUTATED FLUX SYSTEM PHASE OFFSET", and the contents of which are hereby incorporated by reference in their entirety.

Figure 5C:
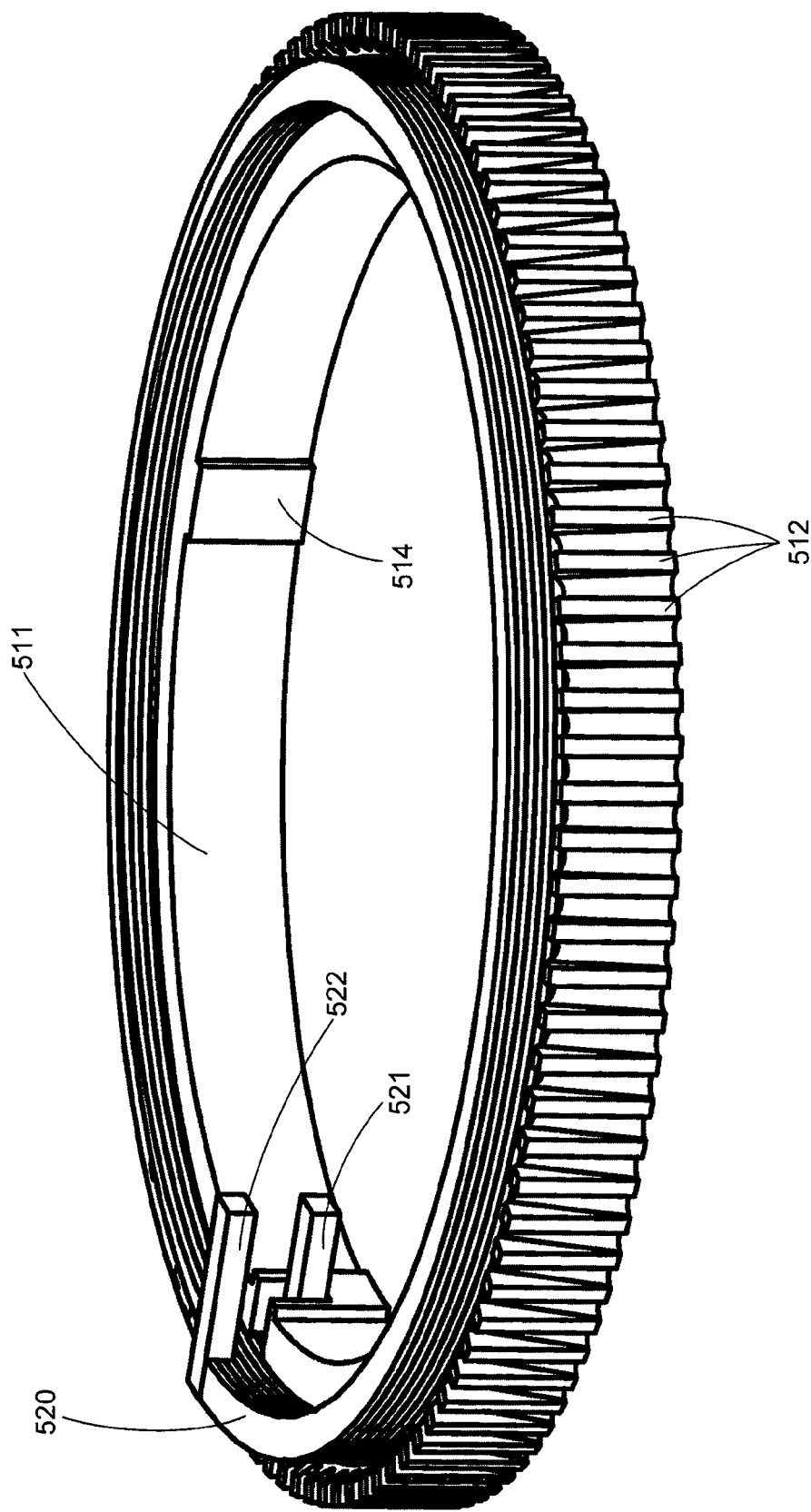
FIG. 5C illustrates the stator portion of FIG. 5B coupled to a coil in accordance with an exemplary embodiment.

With reference now to FIG. 5C, in various exemplary embodiments stator phase portion 511 may be configured to at least partially enclose a coil 520. For example, stator phase portion 511 may be configured with a trench, void, or cavity wherein a portion of coil 520 may be placed. Additionally, stator phase portion 511 may be configured with one or more access holes 518 whereby an electrical connection to coil 520 (and/or coil 520 itself) may pass into and/or out of stator phase portion 511, or otherwise be coupled to external electric components.

Figure 5D:
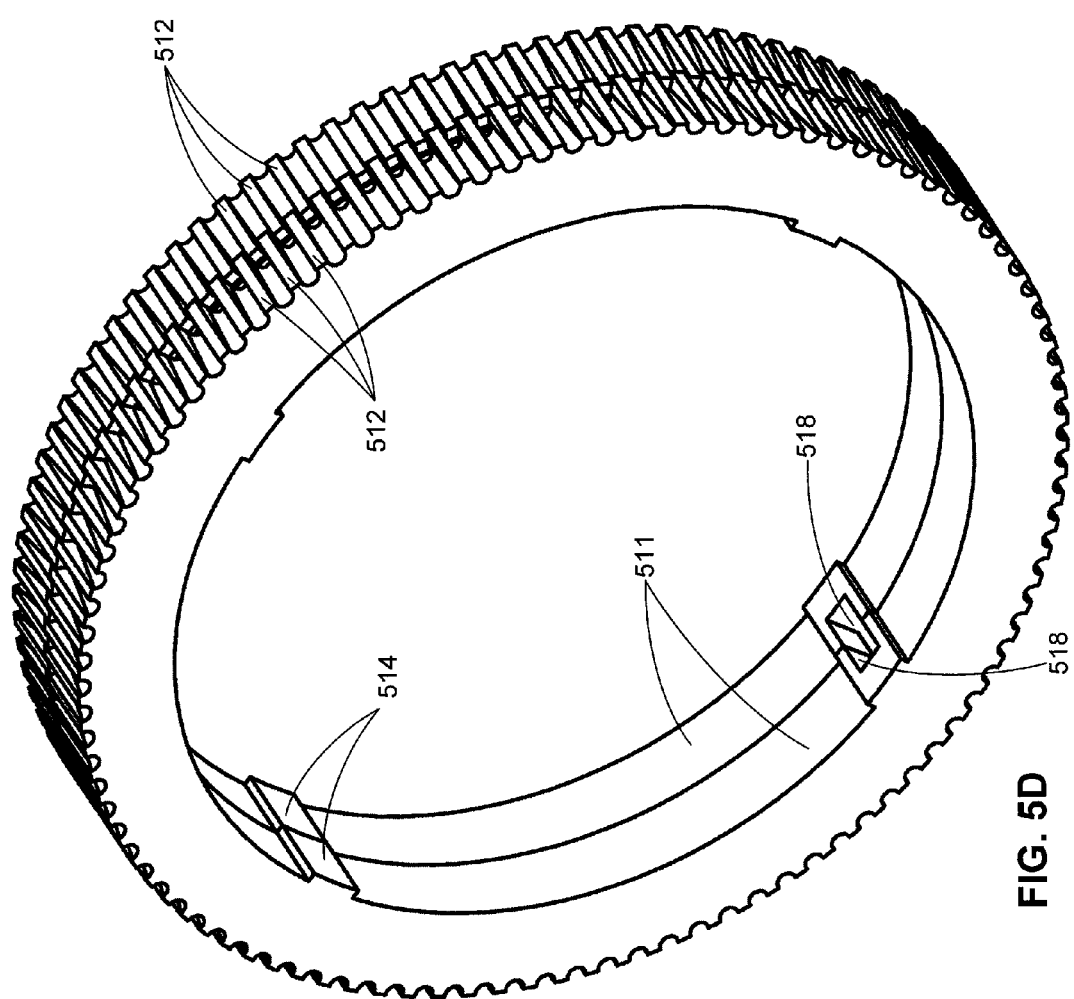
FIG. 5D illustrates two exemplary stator portions coupled to form an exemplary single-phase stator assembly in accordance with an exemplary embodiment.

With reference now to FIG. 5D, in accordance with various exemplary embodiments two similar stator phase portions 511 may be brought together in order to at least partially surround or enclose coil 520. In an exemplary embodiment, stator phase portions 511 are substantially mirror images of one another, with the exception that stator teeth 512 located on one of the stator phase portions 511 are offset when compared to stator teeth 512 located on the other stator phase portion 511. In this manner, when brought together around a coil 520, stator phase portions 511 form a set of flux paths about coil 520. For example, the stator teeth 512 located on one of the stator phase portions 511 are interleaved with stator teeth 512 located on the other stator phase portion 511. In this manner, stator phase portions 511 combine to provide a set of alternating flux switches formed by the interleaved stator teeth 512.

Figure 5E:
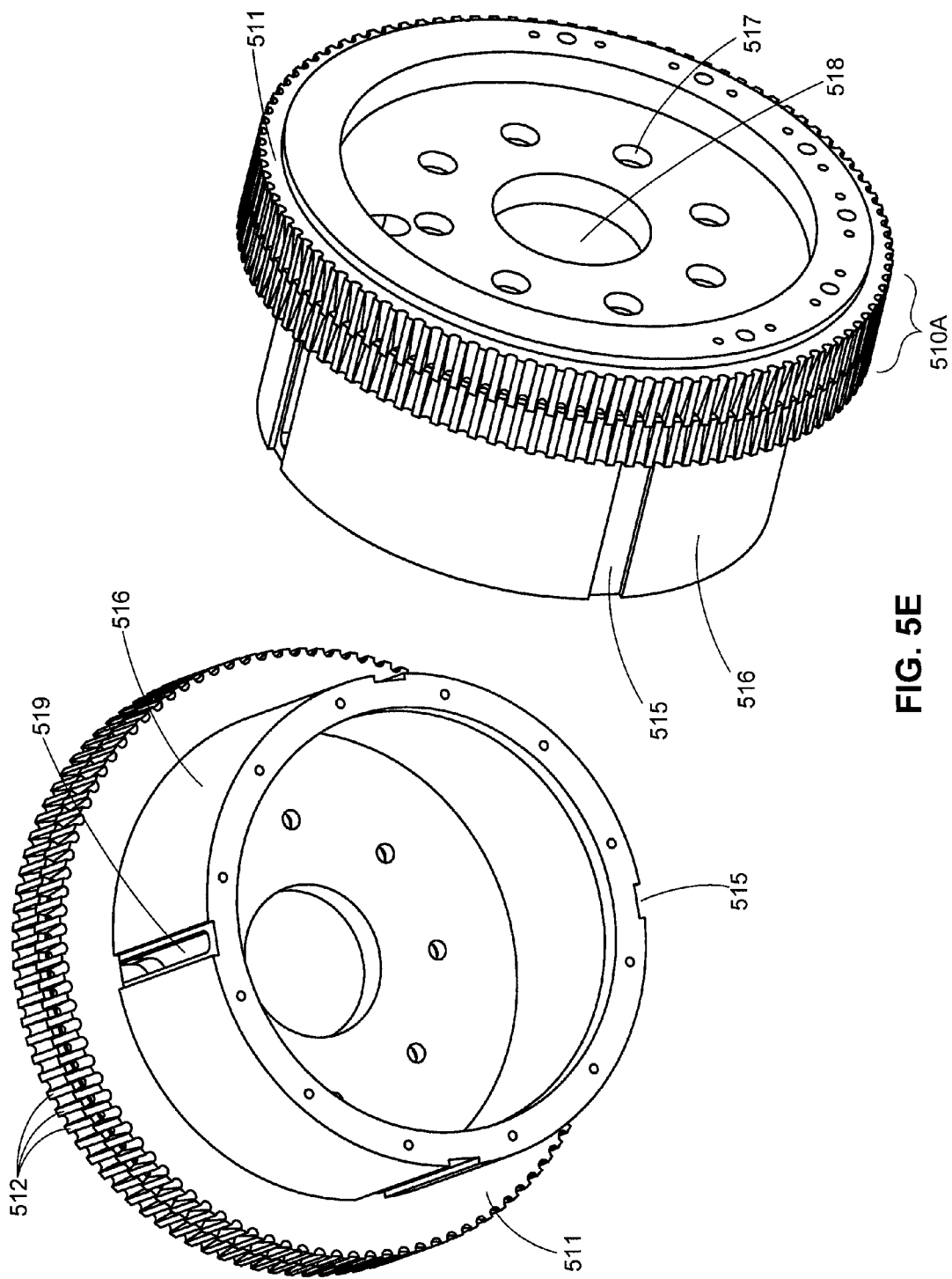
FIG. 5E illustrates the exemplary single-phase stator assembly of FIG. 5D coupled to a stator hub in accordance with an exemplary embodiment.
Figure 5F:
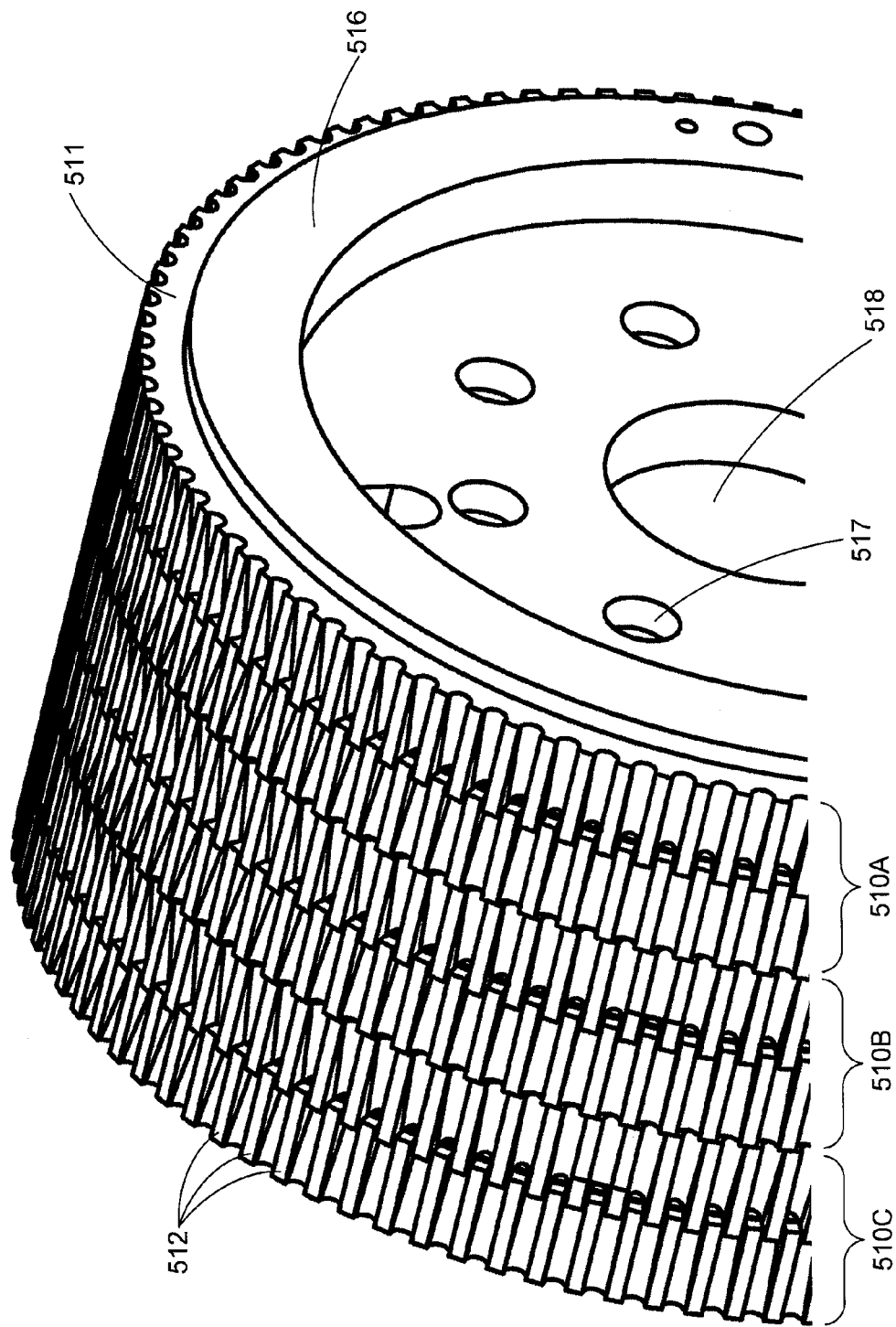
FIG. 5F illustrates another view of the exemplary polyphase stator assembly of FIG. 5A in accordance with an exemplary embodiment.

Turning now to FIGS. 5E-5F, in accordance with various exemplary embodiments a plurality of stator phase portions 511 may be coupled to stator body 516 in order to form stator assembly 510. Additionally, stator body 516 may be configured with various mounting and/or guidance features, as desired. For example, in an exemplary embodiment stator body 516 is configured with a slot 519 therethrough in order to allow portions of the coils to be coupled to other electrical components. In various exemplary embodiments, stator body 516 comprises one or more trenches 515 configured to align with corresponding flanges 514 on stator phase portions 511. In this manner, stator phase portions 511 may be guided and/or "slid" onto stator body 516 or otherwise coupled thereto. The interface of trench 515 and flange 514 secures stator phase portion 511 in a fixed rotational position with respect to stator body 516. In this manner, by selecting the placement of flange 514 on a particular stator phase portion 511, the alignment of adjacent stator phase portions 511 may be controlled and/or modified. In other exemplary embodiments, one or more stator phase portions 511 are coupled to stator body 516 by gluing and/or welding. Moreover, stator phase portions 511 may be fixedly and/or adjustably attached and/or coupled to stator body 516 in any suitable permanent and/or non-permanent manner.

For example, in an exemplary embodiment, with continued reference to FIGS. 5E and 5F, a total of six stator phase portions 511 are coupled to stator body 516 in order to form three stator phases 510A, 510B, and 510C. Based on the position of one or more flanges 514, the rotational position of one or more stator phase portions 511, the configuration of various stator teeth 512, the spacing of various stator teeth 512 (for example, spacing according to a sixth-phase offset), and/or other suitable adjustments, stator phases 510A, 510B, and 510C may be configured to differ in phase. For example, stator phases 510A, 510B, and 510C may be configured to be offset in phase by about 120 degrees with respect to one another. Moreover, two or more of stator phases 510A, 510B, and 510C may be configured to be in-phase with one another. Stated generally, phase relationships between any of stator phases 510A, 510B, and 510C may be selected, varied, controlled, and/or adjusted, as desired, in order to produce one or more operational characteristics of stator assembly 510.

Additional details regarding a sixth-phase offset are disclosed in U.S. patent application Ser. No. 12/772,962 filed on May 3, 2010, now U.S. Patent Application Publication No. 2011/0169366 entitled "TRANSVERSE AND/OR COMMUTATED FLUX SYSTEM PHASE OFFSET", the contents of which are hereby incorporated by reference in their entirety. Additional details regarding polyphase transverse and/or commutated flux machines and principles therefor are disclosed in U.S. patent application Ser. No. 12/611,737 filed on Nov. 3, 2009, now U.S. Pat. No. 7,868,508 entitled "POLYPHASE TRANSVERSE AND/OR COMMUTATED FLUX SYSTEMS", the contents of which are hereby incorporated by reference in their entirety.

In various exemplary embodiments, a motor controller and/or other electronic components (sensors, etc) may be disposed within stator body 516, for example in the generally cylindrical space between the inner walls of stator body 516. The electronic components may be configured to not interfere with an axle, bearings, and/or other components also disposed within stator body 516.

Figure 6A:
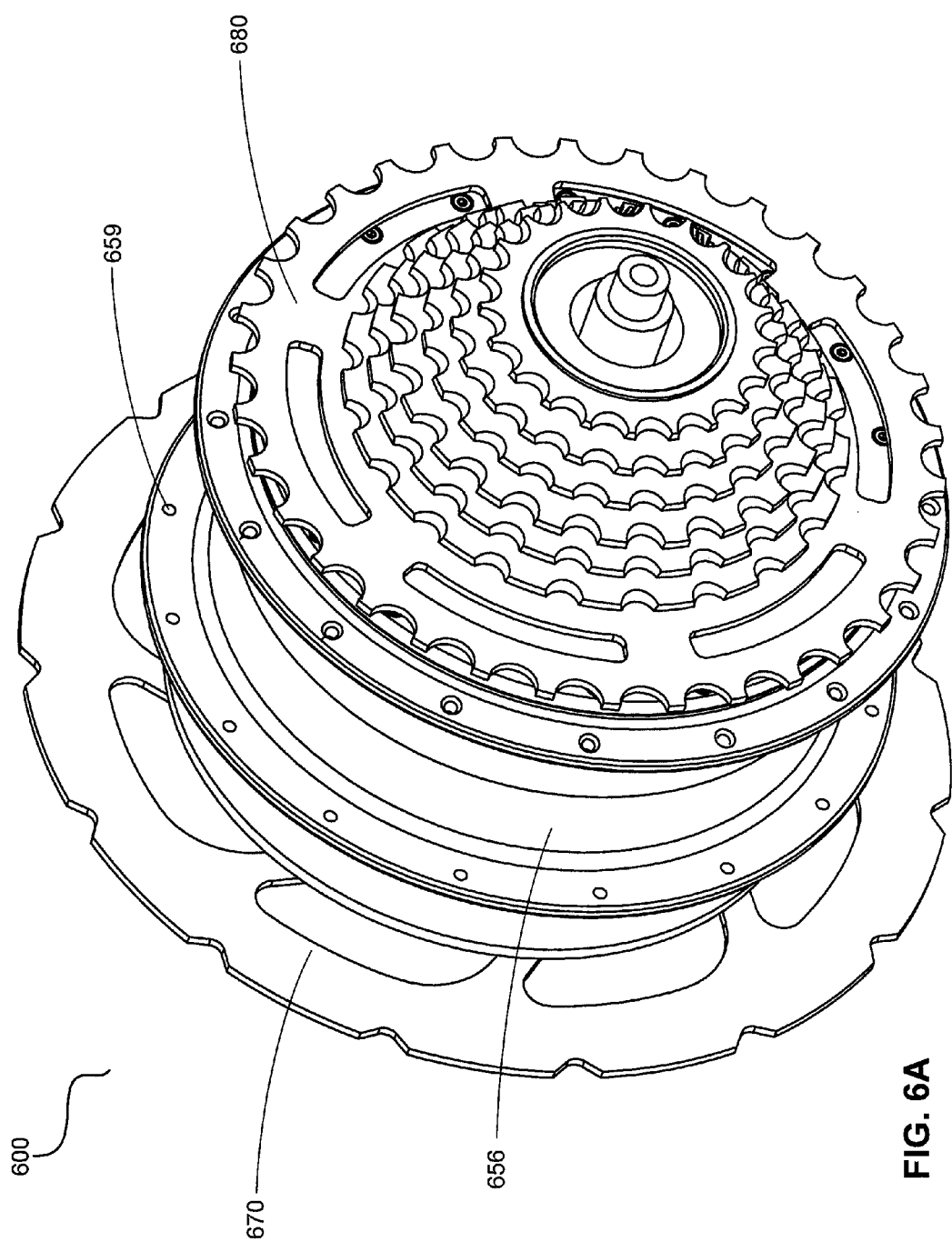
FIG. 6A illustrates an exemplary transverse flux machine coupled to a brake disc and a gear cassette in accordance with an exemplary embodiment.

Turning now to FIGS. 6A-6D, in various exemplary embodiments a rotor assembly (e.g., rotor assembly 450) and a stator assembly (e.g., stator assembly 510) may be coupled to form a transverse flux machine and/or commutated flux machine, for example transverse flux machine 600. Transverse flux machine 600 may be configured with a suitable number of phases, for example one phase, two phases, three phases, and/or the like, as desired. With reference to FIG. 6A, in an exemplary embodiment transverse flux machine 600 may be generally configured with an outer form factor at least partially defined by rotor body 656. Transverse flux machine 600 may be coupled to a wheel, for example a bicycle wheel, via a plurality of spoke holes 659. Transverse flux machine 600 may also be coupled to brake disc 670 and/or gear cassette 680 in order to allow transverse flux machine to interface with various driveline and/or control components of a bicycle or other LEV (e.g., brake calipers, foot pedals, chains, belts, and/or the like).

In various exemplary embodiments, transverse flux machine 600 is configured to be located in the same location as and/or replace the hub of a wheel, such as an e-bike wheel. Stated another way, in certain exemplary embodiments transverse flux machine 600 may be no wider along the axis of rotation than an available distance in a wheel, for example the distance between gear cassette 680 and brake disc 670. Moreover, in many exemplary embodiments transverse flux machine 600 may be configured to be lightweight, for example having a total mass of less than 3 kilograms including all structural, mechanical, electrical, and magnetic components. Additionally, transverse flux machine 600 may be configured to be compact, for example having a volume less than 2,000 cubic centimeters (cc), less than 1000 cc, and/or less than 750 cc. In various exemplary embodiments, transverse flux machine 600 may provide a continuous, thermally stable output torque of about 5 Newton-meters to about 30 Newton-meters, and a peak output torque of about 10 Newton-meters to about 60 Newton-meters. Yet further, transverse flux machine 600 may be operative at a high efficiency, for example an efficiency above 90%, over a particular output torque range, for example between an output torque of about 15 Newton-meters to about 45 Newton-meters, and/or over a particular RPM range, for example between about 25 RPM and about 300 RPM. Stated generally, transverse flux machine 600 may be more compact, torque dense, efficient, and/or powerful than various prior electrical machines, particularly electrical machines of a similar size and/or mass.

Figure 6B:
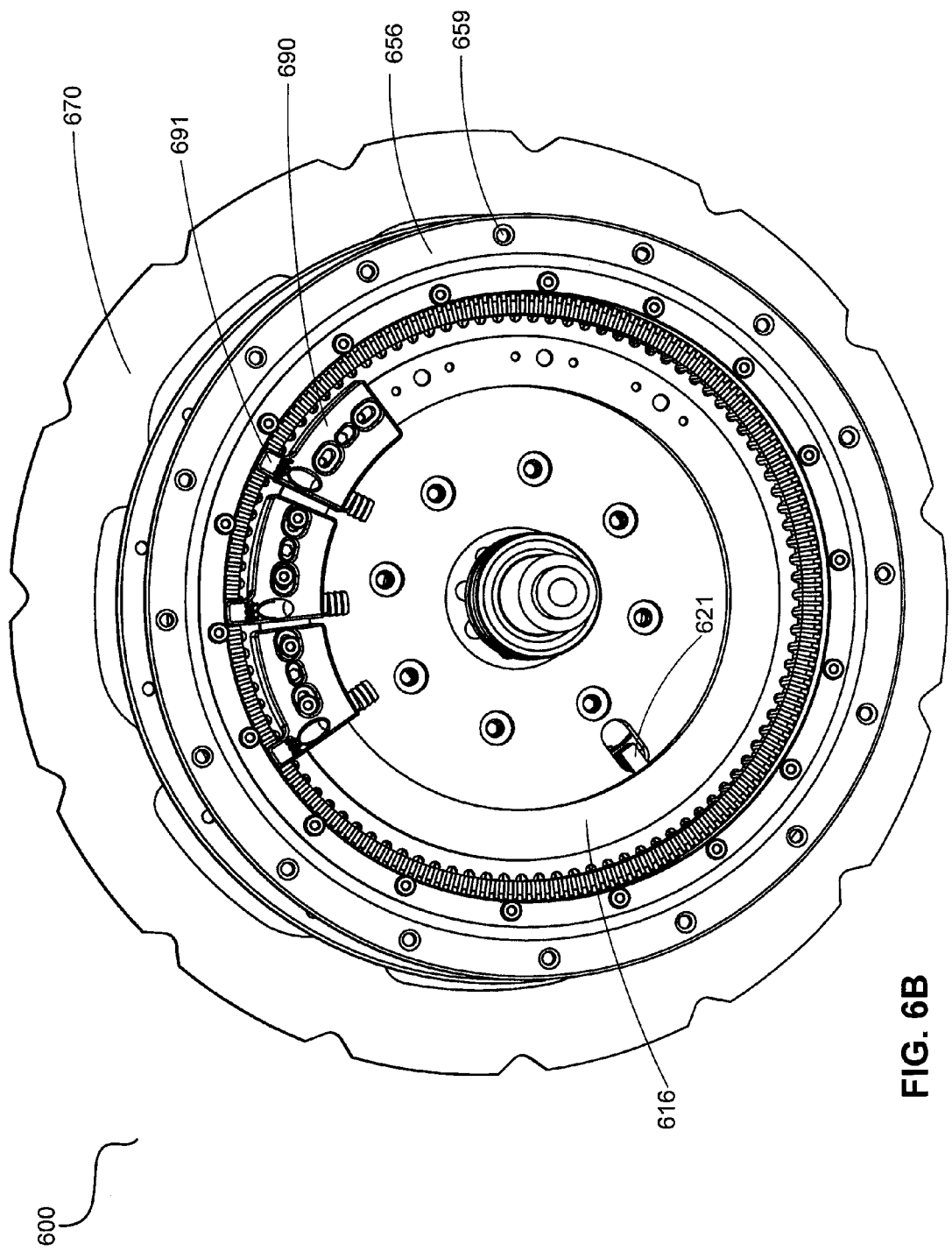
FIG. 6B illustrates sensors coupled to a stator hub of an exemplary transverse flux machine in accordance with an exemplary embodiment.

In various exemplary embodiments, with reference now to FIG. 6B, transverse flux machine 600 may be configured with one or more sensor assemblies 690. Sensor assembly 690 may comprise any suitable sensor and/or associated electronics and related components, for example a temperature sensor, a current sensor, a voltage sensor, a Hall effect sensor, and/or any other suitable sensor or device configured to measure a value related to operation and/or control of transverse flux machine 600. In an exemplary embodiment, sensor assembly 690 further comprises Hall effect sensor 691. Hall effect sensor 691 may be mounted, located, and/or otherwise configured to measure one or more characteristics of transverse flux machine 600. For example, in an exemplary embodiment Hall effect sensor 691 is extended along the edge of alternating magnets and flux concentrators comprising rotor assembly 650. In this manner, Hall effect sensor 691 may facilitate control of and/or characterization of operation of transverse flux machine 600, such as by facilitating measurement of a rotational position of rotor assembly 650 with respect to stator assembly 610. Sensor assembly 690 may be located at any suitable location on transverse flux machine 600. Sensor assembly 690 may also be coupled to any suitable portion of transverse flux machine 600, for example stator body 616.

Figure 6C:
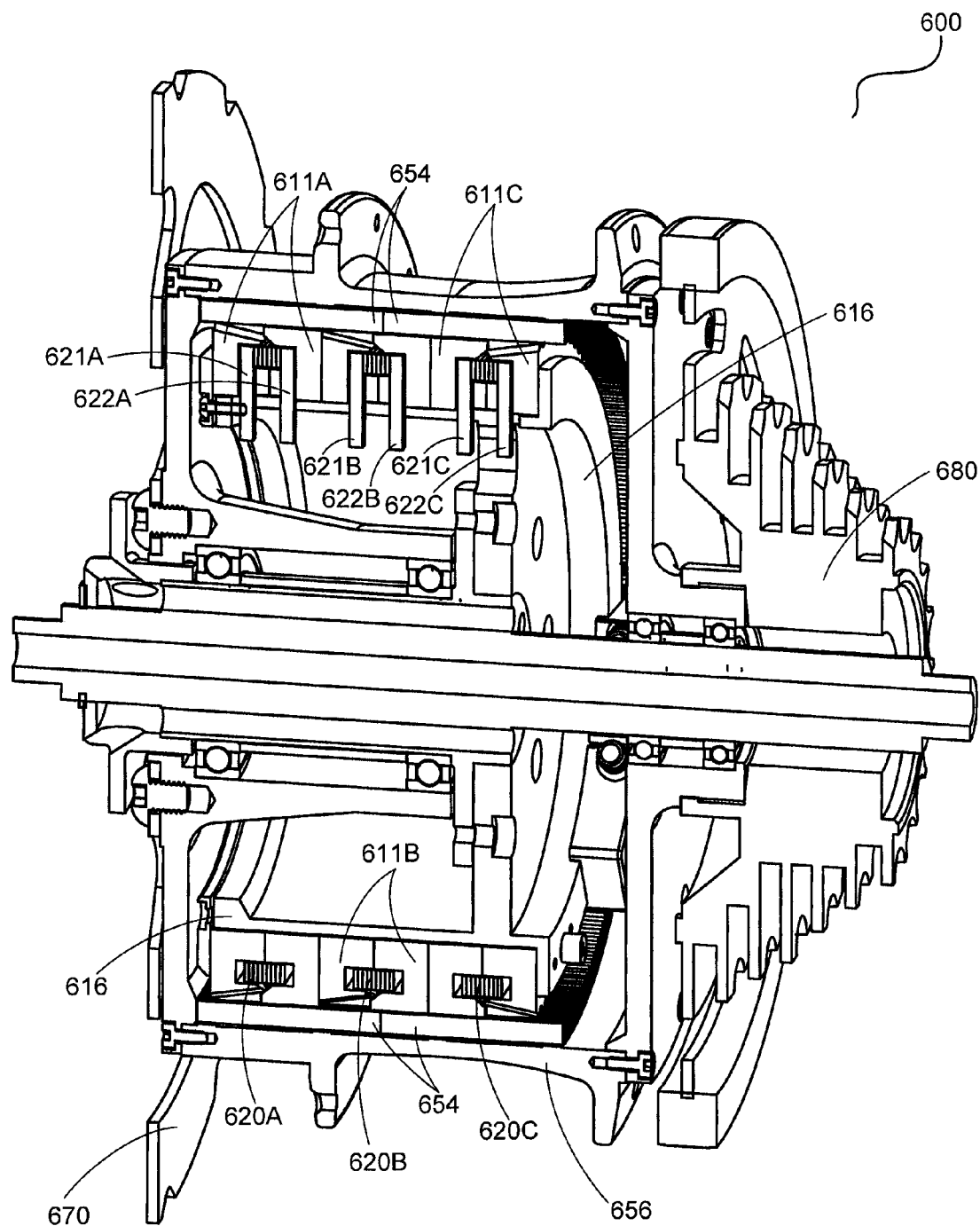
FIG. 6C illustrates, in cut-away view, an exemplary transverse flux machine coupled to a brake disc and a gear cassette in accordance with an exemplary embodiment.
Figure 6D:
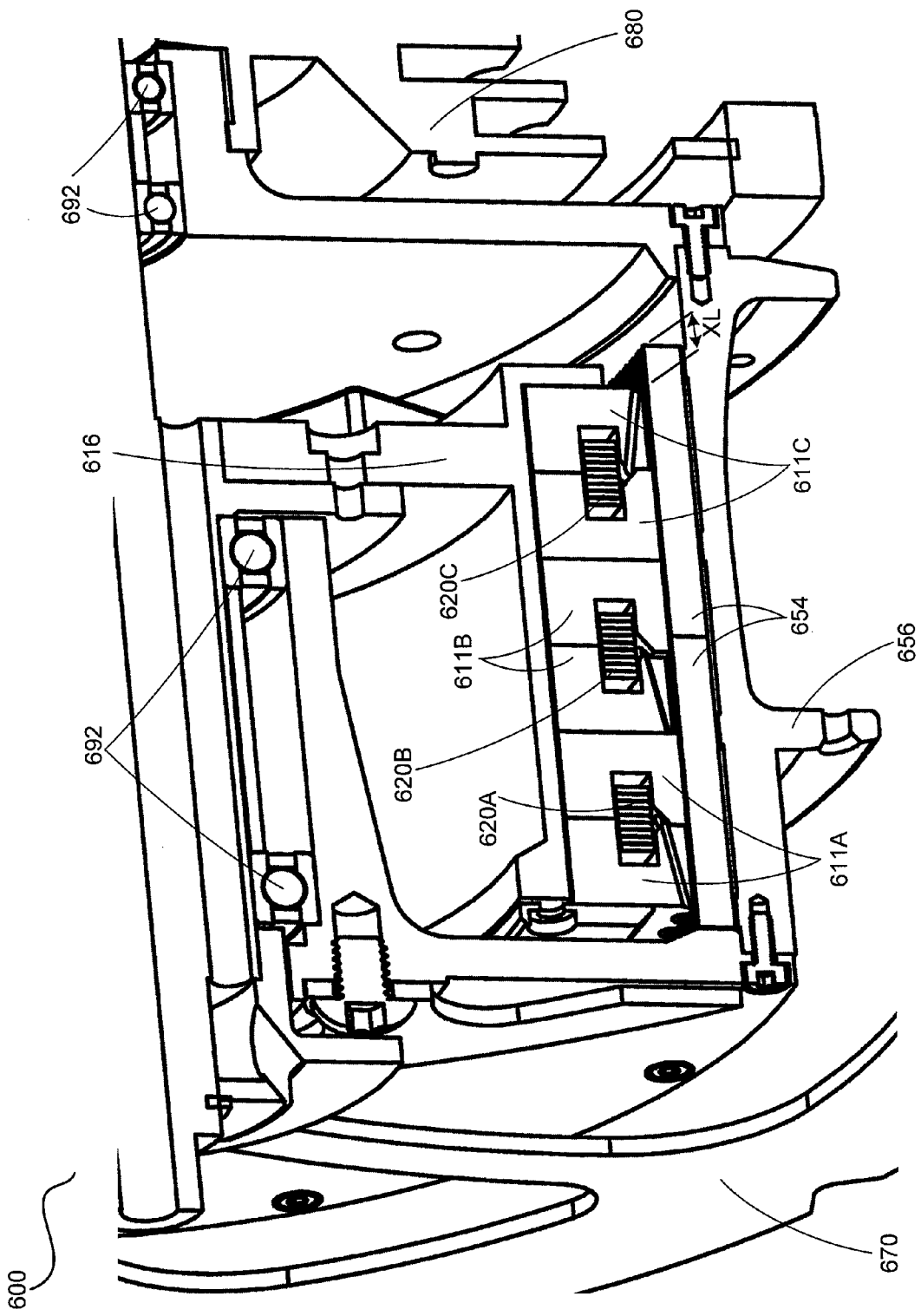
FIG. 6D illustrates, in cut-away view, a close-up of portions of an exemplary transverse flux machine coupled to a brake disc and a gear cassette in accordance with an exemplary embodiment.

Turning now to FIGS. 6C and 6D, in various exemplary embodiments transverse flux machine 600 is configured as a polyphase device. Stator portions 611A and coil 620A comprise a first phase, stator portions 611B and coil 620B comprise a second phase, and stator portions 611C and coil 620C comprise a third phase. Moreover, transverse flux machine 600 may comprise additional phases and/or fewer phases, as desired.

With continued reference to FIG. 6D, in various exemplary embodiments magnets 654 and/or flux concentrators 652 may be at least partially "overhung" beyond an edge of stator phase portions 611 in a direction substantially parallel to the air gap therebetween. For example, magnets 654 and/or flux concentrators 652 may be overhung by a distance XL. In this manner, the peak magnitude of the back EMF waveforms associated with each of stator phases 600A, 600B, and 600C may be more closely matched with one another. For example, via use of an overhung rotor (e.g., magnets 654 and flux concentrators 652), in an exemplary embodiment transverse flux machine 600 may be configured with three phases 600A, 600B, and 600C wherein the peak magnitude of the respective back EMF waveforms differs by no more than 5 percent.

Stated another way, via use of an overhung rotor, the performance of each of stator phases 600A, 600B, and 600C may be made more similar. In an exemplary embodiment, magnets 654 and flux concentrators 652 are overhung past the edge of stator phases 600A and 600C a distance XL of about 2.75 mm. In various exemplary embodiments, distance XL is between about 0.5 mm and about 4 mm. Additional details regarding overhung rotors and/or stators are disclosed in U.S. patent application Ser. No. 12/772,958 filed on May 3, 2010, now U.S. Patent Application Publication No. 2011/0169365 entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING".

In various exemplary embodiments, responsive to an energizing current provided to one or more of coils 620A, 620B, and 620C, rotor assembly 650 is driven to rotate. Rotor assembly 650 is rotationally supported about an axis by one or more bearings 692. One or more wheel spokes are coupled to spoke holes 659, thus transferring torque from transverse flux machine 600 to a wheel in order to propel an e-bike or other LEV.

In various exemplary embodiments, transverse flux machine 600 is connected to the wheel of the e-bike in a "direct drive" manner. In these embodiments, inefficiencies and/or losses associated with a gearbox or other external mechanical components may be reduced and/or eliminated, allowing an e-bike to achieve an extended range on a similar battery. Moreover, elimination of the gearbox may allow for increased room for transverse flux machine 600, allowing transverse flux machine to be expanded in size and hence in power. Thus, elimination of the gearbox may also facilitate improved acceleration, top speed, and hill-climbing ability of the e-bike.

In other exemplary embodiments, transverse flux machine 600 may be coupled to a wheel via a gearbox or other suitable method, in order to provide an expanded operational speed and/or torque profile of the e-bike, provide improved hill-climbing ability, and/or the like.

In various exemplary embodiments, torque may be delivered to the e-bike wheel via a human operator pushing on the bicycle pedals, which are coupled to gear cassette 680 via chain 682. Thus, propulsion of the e-bike may result from human force, from operation of transverse flux machine 600, and/or combinations of the same.

In certain exemplary embodiments, transverse flux machine 600 may be driven to rotate in response to a mechanical force, for example responsive to rotation of gear cassette 680 via chain 682. In these embodiments, transverse flux machine 600 may be configured to function as a generator, inducing an output current in one or more of coils 620A, 620B, and 620C. The output current may be used as desired, for example in order to recharge a battery, operate a light, and/or the like.

In an exemplary embodiment, transverse flux machine 600 comprises about 800 grams of active magnetic and electrical materials. In this embodiment, transverse flux machine 600 comprises about 2.9 kilograms of total mass, including electrical, magnetic, mechanical, and structural materials. In various exemplary embodiments, transverse flux machine 600 comprises between about 750 grams and about 1500 grams of active magnetic and electrical materials, and between about 2.5 kilograms and about 4.5 kilograms of total mass.

In certain exemplary embodiments, transverse flux machine 600 is configured with a continuous, thermally stable torque density of about 30 Newton-meters per kilogram. In these embodiments, transverse flux machine 600 is configured with a peak torque density of about 60 Newton-meters per kilogram. In other exemplary embodiments, transverse flux machine 600 is configured with a continuous, thermally stable torque density of between about 5 Newton-meters per kilogram and about 50 Newton-meters per kilogram.

In various exemplary embodiments, transverse flux machine 600 and a suitable motor controller (not shown in the figures) have a combined operational efficiency of greater than 85 percent. In certain exemplary embodiments, transverse flux machine 600 and a suitable motor controller have a combined operational efficiency of greater than 90 percent. In one exemplary embodiment, transverse flux machine 600 and a suitable motor controller have a combined operational efficiency of about 92 percent.

As used herein, "continuous, thermally stable torque density" refers to a torque density maintainable by a motor, without active cooling, during continuous operation over a period of one hour or more. Moreover, in general, a continuous, thermally stable torque density may be considered to be a torque density maintainable by a motor for an extended duration of continuous operation, for example one hour or more, without significant thermal performance degradation and/or damage.

In various exemplary embodiments, transverse flux machine 600 is configured with low coil resistance for each of coils 620A, 620B, and 620C, for example resistance below 0.1 ohms. In an exemplary embodiment, transverse flux machine 600 is configured with coil resistance of less than 0.05 ohms in each of coils 620A, 620B, and 620C. Thus, transverse flux machine 600 achieves reduced resistive losses as compared to typical electric bike motors, which may have a coil resistance of about 0.375 ohms or more. For example, at 20 amps of current, transverse flux machine 600 may operate with resistive losses of about 20 watts, while a typical electric bike motor may operate with resistive losses of 150 watts or more. At 30 amps of current, transverse flux machine 600 may operate with resistive losses of about 35 watts, while a typical electric bike motor may operate with resistive losses of 325 watts or more. Thus, in certain exemplary embodiments transverse flux machine 600 is configured to operate at high current levels with significantly smaller resistive losses as compared to electric motors having higher coil resistances. Additionally, in certain exemplary embodiments transverse flux machine 600 is configured to operate at higher output torque levels (for example, output torque levels five times higher, ten times higher, and/or more) compared to electric motors having similar coil resistances.

In various exemplary embodiments, transverse flux machine 600 is configured to operate over a desired RPM range. In one exemplary embodiment, transverse flux machine 600 is configured to operate over an RPM range of between about 0 RPM to about 200 RPM. In another exemplary embodiment, transverse flux machine 600 is configured to operate over an RPM range of between about 0 RPM to about 500 RPM. In general, transverse flux machine 600 may be configured to operate over any suitable RPM range in order to operate an e-bike or other PEV.

Further, in various exemplary embodiments, transverse flux machine 600 is configured to achieve a high flux switching frequency at a comparatively low physical RPM. In general, a flux switching frequency ("fundamental frequency") is equal to the RPM times the number of poles, divided by 120. Thus, because transverse flux machine 600 may be configured with a large number of motor poles (for example, 50 poles, 100 poles, 200 poles, and/or more poles), transverse flux machine 600 may have a higher fundamental frequency than various prior e-bike motors, prior transverse flux machines, and/or prior commutated flux machines. For example, in one exemplary embodiment transverse flux machine 600 is configured to achieve a flux switching frequency in excess of 250 Hz at a physical RPM of less than 300 RPM. In another exemplary embodiment, transverse flux machine 600 is configured to achieve a flux switching frequency in excess of 500 Hz at a physical RPM of less than 300 RPM. In yet other exemplary embodiments, transverse flux machine 600 is configured to achieve a flux switching frequency in excess of 1000 Hz at a physical RPM of less than 600 RPM.

Figure 6E:
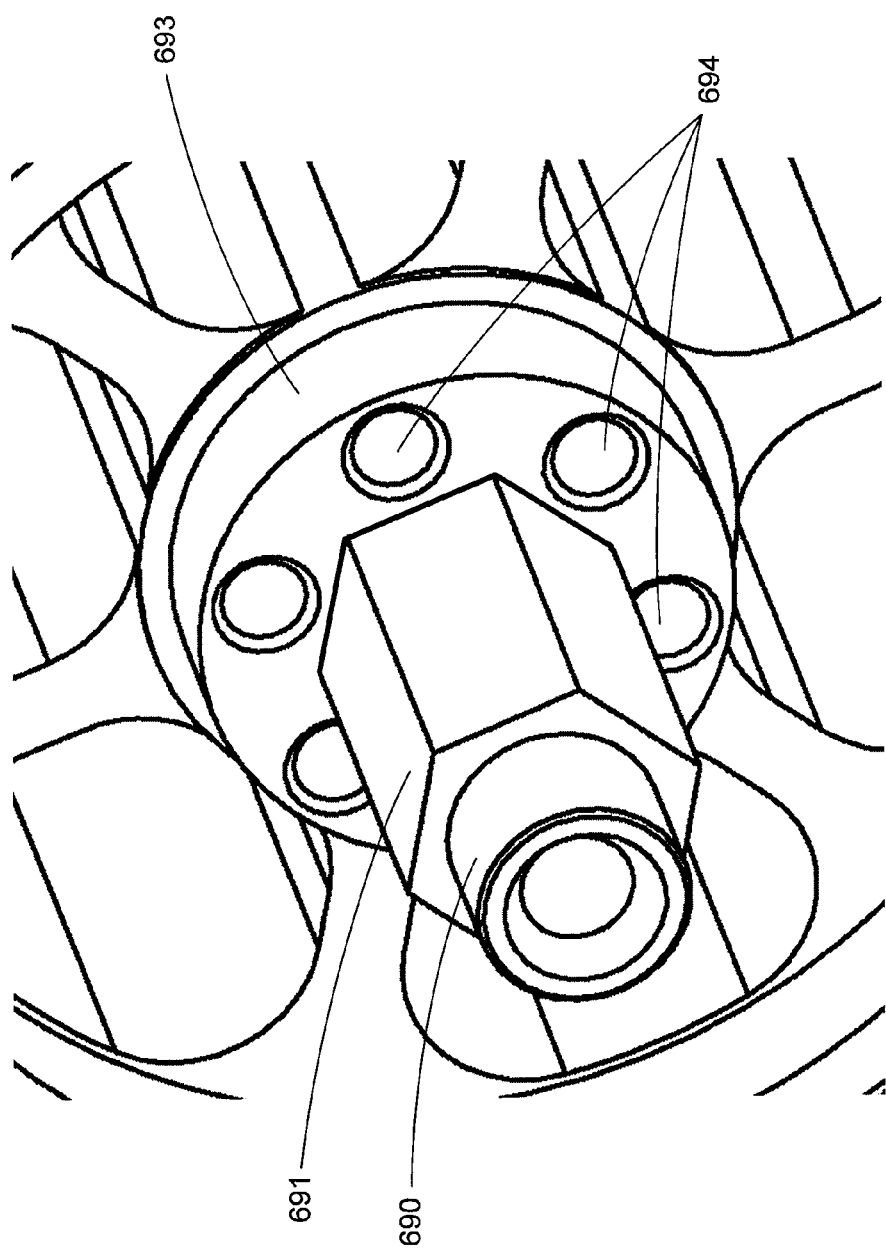
FIG. 6E illustrates an exemplary axle configuration in accordance with an exemplary embodiment.

In an exemplary embodiment, with reference now to FIG. 6E, transverse flux machine 600 is configured with an axle 690. At least part of axle 690 is configured as a shaped axle portion 691. Shaped axle portion 691 may be hexagonal, square, pentagonal, star-shaped, and/or any other suitable shape, as desired.

Torque produced by transverse flux machine 600 may be transferred through axle 690 to other portions of an e-bike, for example via a mechanical coupling to shaped axle portion 691. Additionally, a terminal portion of axle 690 may be configured to be compatible with standard quick release coupling components. For example, axle 690 may be at least partially hollow. Additionally, axle 690 may be of sufficient length to extend into a dropout in a bicycle frame, without extending fully to the end of the dropout.

In various exemplary embodiments, with continued reference to FIG. 6E, a bearing 692 (not shown in FIG. 6E) is supported along the inner diameter of bearing 692 by a bearing support surface 693. A plurality of holes 694 are disposed "under" bearing support surface 693 (e.g., between bearing support surface 693 and an axis of rotation of transverse flux machine 600). Electrical couplings, for example wires, may be passed through holes 694, allowing access to one or more coils 620 (not shown in FIG. 6E). This "under bearing" wire routing approach can enable simplified and/or more compact wire routing for transverse flux machine 600. Additionally, an under bearing wire routing approach enables transverse flux machine 600 to be compatible with both a standard disk brake and standard quick release components. For example, an under bearing wire routing approach eliminates wire routing through the axle, allowing a quick release coupling at the end of the axle.

In various exemplary embodiments, transverse flux machine 600 may be configured with either an axial gap configuration or a radial gap configuration. Transverse flux machine 600 may also comprise either a face engaged configuration or a cavity engaged configuration. Similarly, a commutated flux machine configured in accordance with principles of the present disclosure may be configured with an axial gap or a radial gap configuration, and a face engaged configuration or a cavity engaged configuration. Additionally, while principles of the present disclosure have generally been discussed in connection with electric motors for e-bikes, transverse flux machines and/or commutated flux machines configured in accordance with principles of the present disclosure may suitably be applied in a wide variety of applications, for example automotive applications, machine tools, appliances, and/or the like.

In various exemplary embodiments, transverse flux machines and/or commutated flux machines may be configured to replace a gear cassette of a bicycle, be interchangeable with a gear cassette of a bicycle, and/or generally be disposed within a similar space as a gear cassette of a bicycle (e.g., be configured as a "cassette motor"). In various prior e-bikes and other LEVs, for example, a motor is typically disposed in the hub of the rear wheel. The rear wheel is often custom designed to accommodate the hub motor. This can increase the expense of the wheel, and limit component selection, as the wheel and hub motor typically are configured as a matched pair. Thus, a particular custom wheel can generally be paired only with a corresponding custom hub motor, and vice versa, rather than wheels and hub motors being generally compatible and/or interchangeable. In contrast, a cassette motor may be retrofittable to a standard rear wheel compatible with a standard gear cassette. Thus, an existing bicycle may be more easily converted to electric operation, for example by removing an existing gear cassette with a standard cassette tool, and installing a cassette motor in place of the gear cassette. Moreover, by replacing a cassette motor with a standard gear cassette, an e-bike may be converted to manual operation.

Figure 7A:
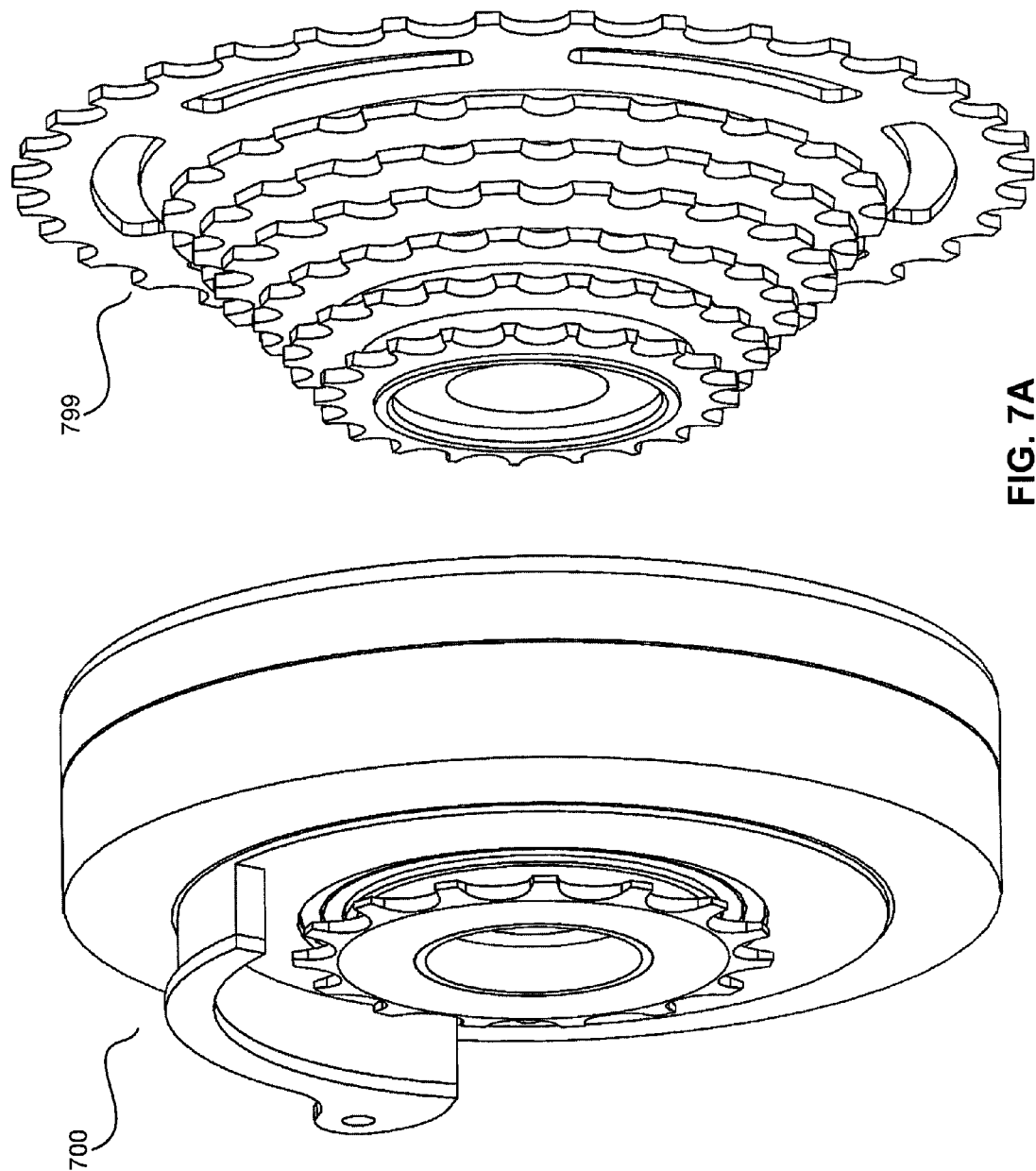
FIG. 7A illustrates a cassette motor and a gear cassette in accordance with an exemplary embodiment.

In various exemplary embodiments, with reference now to FIG. 7A, a cassette motor, for example cassette motor 700, may be configured with about the same external dimensions as a gear cassette, for example gear cassette 799. Cassette motor 700 may also be configured to occupy about the same space as gear cassette 799. For example, cassette motor 700 may have external dimensions (e.g., diameter, width, etc) similar to one or more of a SRAM PG970 cassette, a SRAM PG1070 cassette, a SRAM Red OG-1090 cassette, a Shimano CS-5600 cassette, a Shimano CS-7900 cassette, a Shimano CS-M970 cassette, and/or the like. In various exemplary embodiments, cassette motor 700 is configured with an external diameter of between about 80 millimeters and about 140 millimeters. In an exemplary embodiment, cassette motor 700 is configured with an external diameter of about 130 millimeters. In various exemplary embodiments, cassette motor 700 is configured with a thickness along a rotational axis of cassette motor 700 of between about 15 millimeters and about 40 millimeters. In an exemplary embodiment, cassette motor 700 is configured with a thickness along rotational axis of cassette motor 700 of about 30 millimeters. Moreover, cassette motor 700 may be configured with any suitable dimensions to couple to a bicycle, as desired.

Figure 7B:
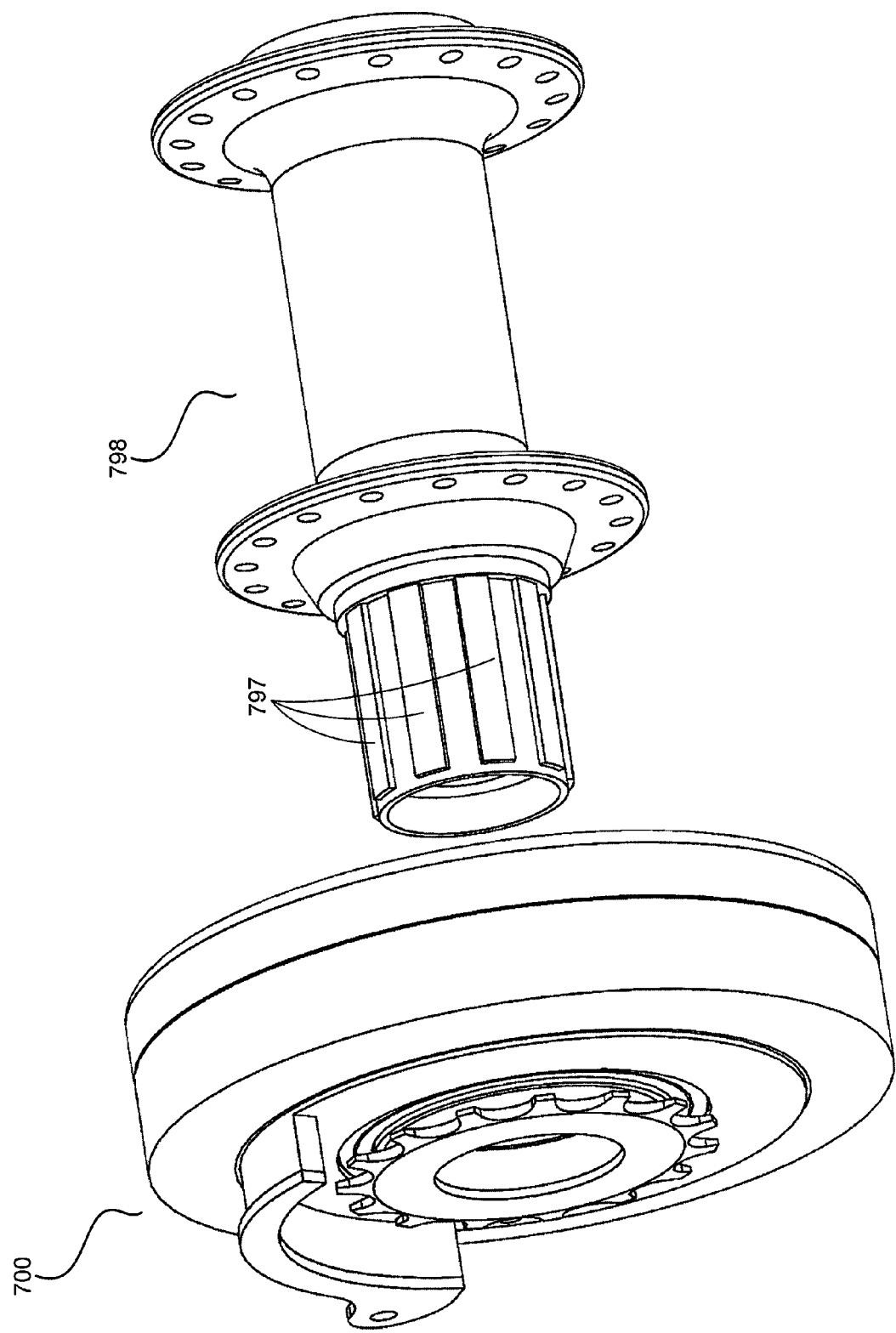
FIG. 7B illustrates a cassette motor and a bicycle hub in accordance with an exemplary embodiment.
Figure 7C:
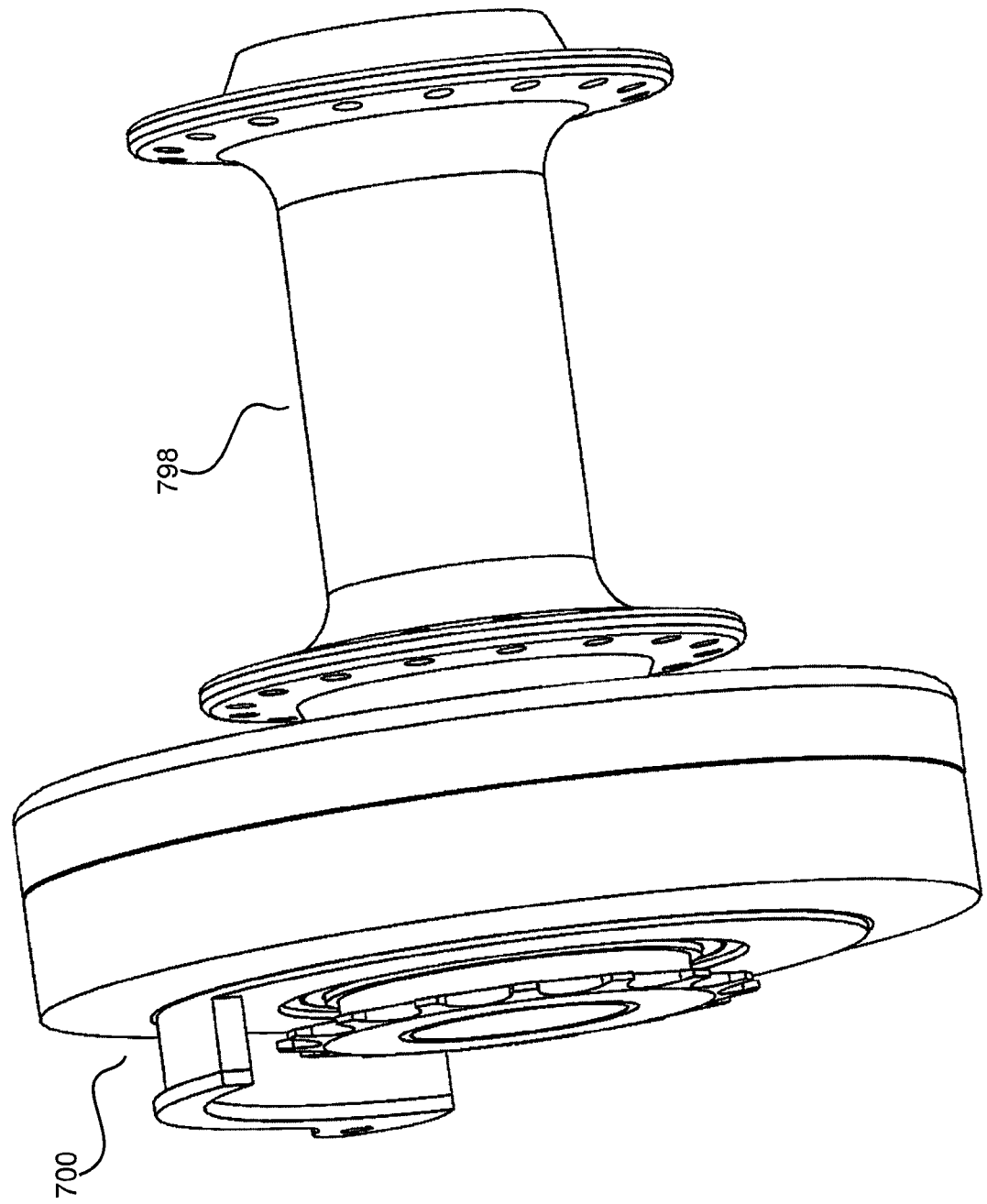
FIG. 7C illustrates a cassette motor coupled to a bicycle hub in accordance with an exemplary embodiment.

In an exemplary embodiment, with reference now to FIGS. 7B and 7C, cassette motor 700 may be configured to mate with a standard cassette-style hub, for example hub 798. For example, cassette motor 700 may engage with grooves 797 on hub 798. In another exemplary embodiment, cassette motor 700 may be configured to mate with a standard freewheel-style hub. For example, cassette motor 700 may engage with threads on the hub. Moreover, cassette motor 700 may be mated to and/or otherwise engaged with a wheel hub in any suitable manner. In general, cassette motor 700 may be configured to engage with and/or otherwise connect to a hub in a similar manner as a standard gear cassette. In this manner, cassette motor 700 may be configured as a drop-in replacement for a standard gear cassette.

Cassette motor 700 may be coupled to a bicycle in various ways and/or locations. In an exemplary embodiment, cassette motor 700 is coupled to an existing bracket or "braze on" located on a bicycle, for example the braze on typically utilized to mount the rear derailleur. Moreover, cassette motor 700 may be coupled to a bicycle via any suitable fasteners, torque arms, brackets, slots, mounts, and/or the like, in order to secure cassette motor 700 to a bicycle.

In an exemplary embodiment, cassette motor 700 is coupled to a standard direct-drive hub. In other exemplary embodiments, cassette motor 700 is coupled to an internally geared rear hub, for example the SRAM "DUALDRIVE II" system or other similar internally geared rear hub. Cassette motor 700 may also be configured with an internal planetary gear or other gear reduction, if desired, in order to further increase output torque. Moreover, gearing between cassette motor 700 and a wheel may be provided via any suitable components and/or combinations thereof.

Figure 7D:
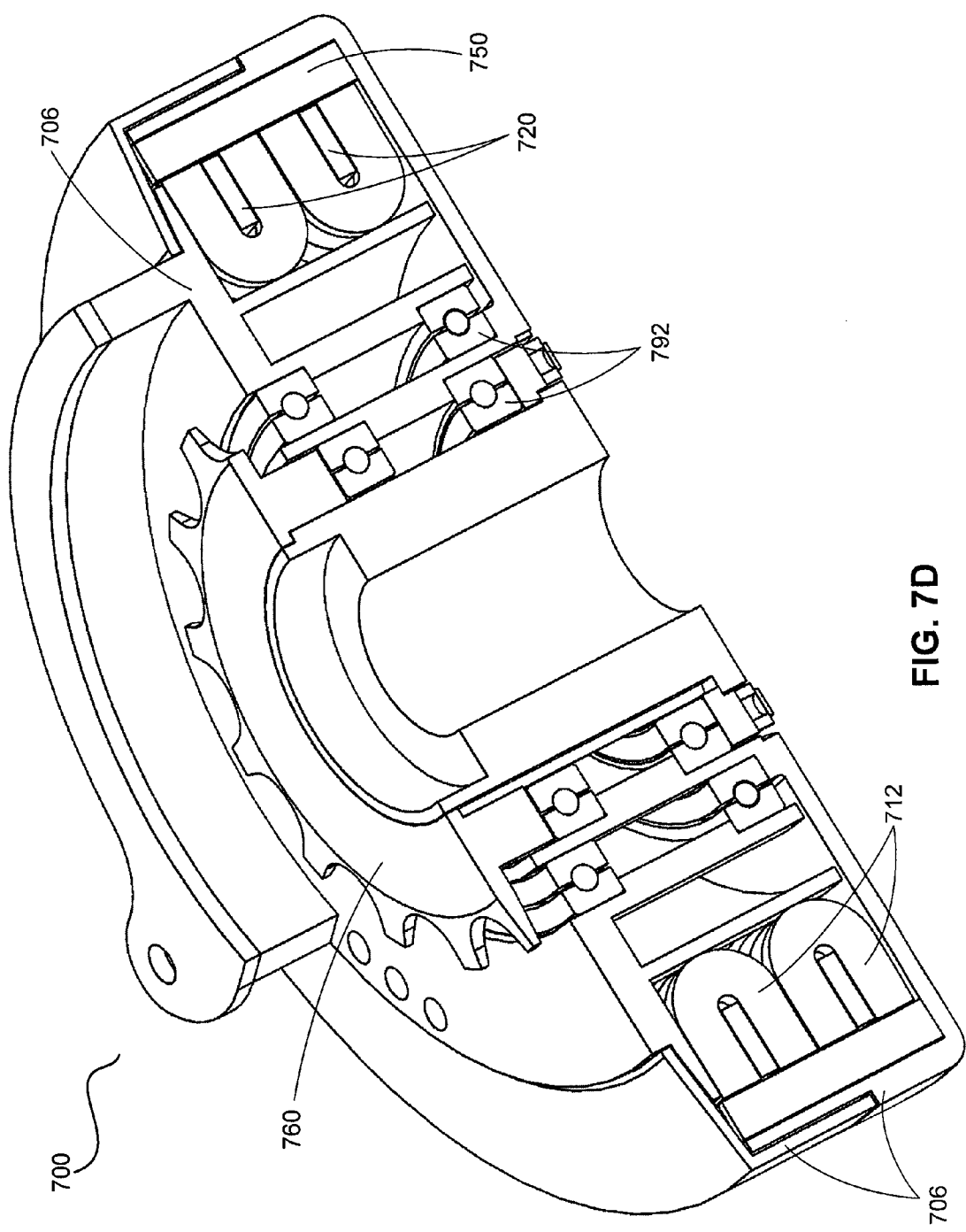
FIGS. 7D and 7E illustrate, in cut-away views, a cassette motor in accordance with an exemplary embodiment.
Figure 7E:
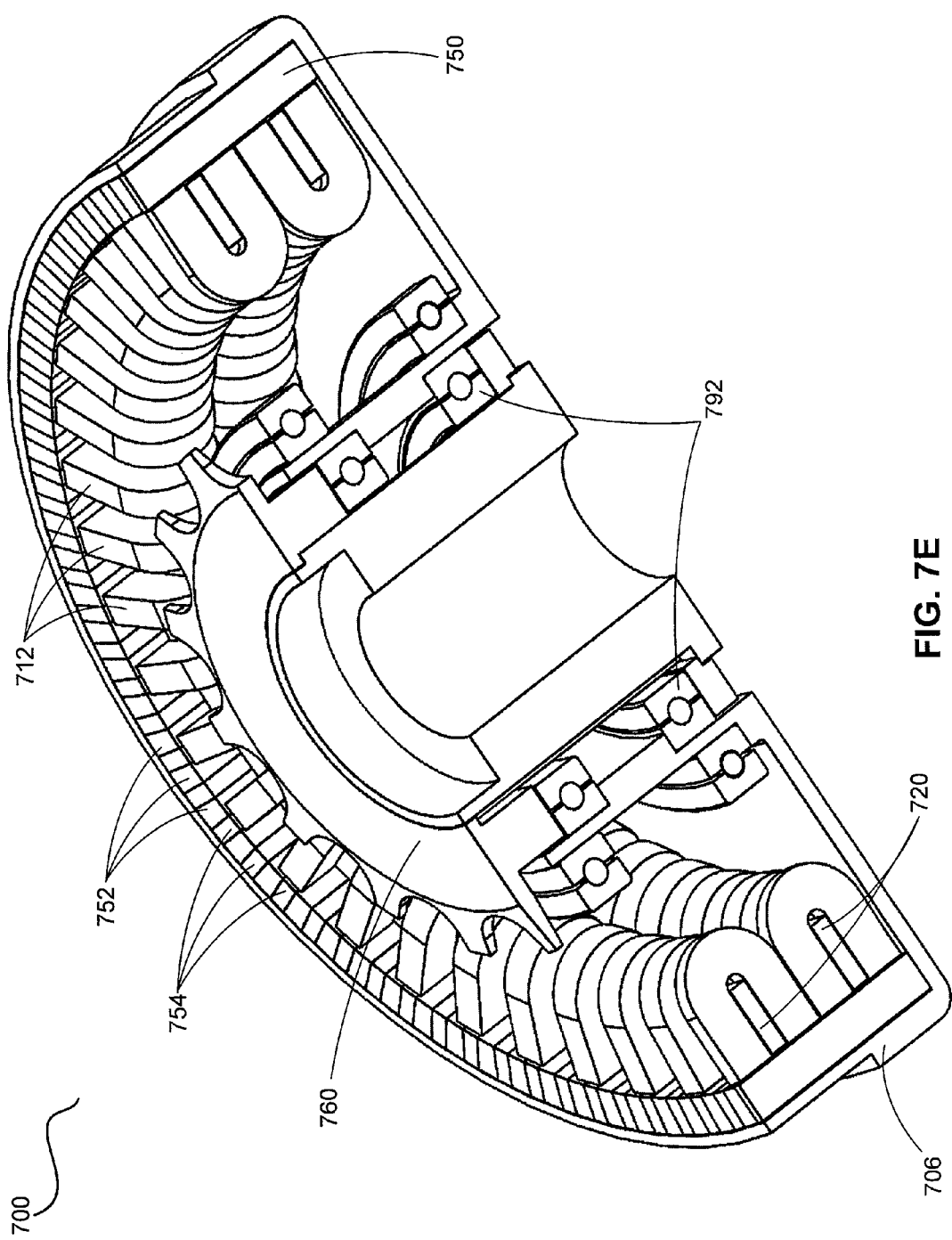

Turning now to FIGS. 7D and 7E, in an exemplary embodiment cassette motor 700 comprises a rotor 750, one or more coils 720, and a plurality of flux switches 712. Rotor 750 comprises a plurality of magnets 754 interleaved with a plurality of flux concentrators 752. Flux switches 712, coils 720, rotor 750, flux concentrators 752, and/or magnets 754 may operate in like manner as similar components described hereinabove.

In an exemplary embodiment, cassette motor 700 further comprises a plurality of structural components 706. Structural components 706 may be configured to support, protect, guide, and/or otherwise couple to and/or contain active magnetic and/or electrical components of cassette motor 700. Portions of cassette motor 700 may be configured to be rotatable with respect to one another, and may be rotatably supported by one or more bearings 792.

In various exemplary embodiments, cassette motor 700 is configured with an external sprocket 760 configured to interface with a chain of a bicycle. In an exemplary embodiment, sprocket 760 is a fixed gear. In another exemplary embodiment, sprocket 760 is a freewheel. Sprocket 760 may be configured to have a similar number of teeth as a sprocket on a gear cassette. Moreover, sprocket 760 may be configured such that, when cassette motor 700 is coupled to a bicycle, sprocket 760 is similarly located, with respect to the bicycle, as a sprocket on a gear cassette when such gear cassette is coupled to the bicycle. Stated generally, sprocket 760 is configured to allow cassette motor 700 to be a "drop in" replacement for a gear cassette of a bicycle. In other words, cassette motor 700 is configured to be compatible with various existing drivetrain components of a bicycle. Moreover, in various exemplary embodiments, cassette motor 700 may be configured with multiple sprockets 760.

In an exemplary embodiment, cassette motor 700 is configured to operate over an RPM range from about 0 RPM to about 200 RPM. In various exemplary embodiments, cassette motor 700 is configured to operate over an RPM range compatible with manual operation of bicycle pedals by a rider. In general, transverse flux machine 600 may be configured to operate over any suitable RPM range in order to operate an e-bike or other PEV. Moreover, in certain exemplary embodiments, cassette motor 700 is configured to achieve peak operational efficiency at an RPM located between about 50 RPM and about 250 RPM. In one exemplary embodiment, cassette motor 700 is configured to achieve peak operational efficiency at about 150 RPM.

In certain exemplary embodiments, because cassette motor 700 may be configured with freewheel action between cassette motor 700 and the wheel (and/or between the chain and sprocket and cassette motor 700), cassette motor 700 may accommodate use of a torque sensor. In this manner, the torque output of cassette motor 700 may be adjusted, tuned, and/or otherwise varied, for example responsive to varying pedaling force of a bicycle rider. The torque output of cassette motor 700 may be varied via any suitable approach. For example, the torque output of cassette motor 700 may be varied by varying an input voltage and/or current provided to cassette motor 700 by a motor controller, by modifying an air gap in cassette motor 700, and/or the like.

Further, in an exemplary embodiment cassette motor 700 may be coupled to a bicycle wheel via spoke engagement, enabling the bicycle wheel to turn cassette motor 700 and allow operation as a generator. In this manner, regenerative operation and/or battery charging may be accomplished via cassette motor 700.

In an exemplary embodiment, cassette motor 700 is configured as a transverse flux machine. In other exemplary embodiments, cassette motor 700 is configured as a commutated flux machine. In various exemplary embodiments, cassette motor 700 is configured with either an axial gap configuration or a radial gap configuration. Cassette motor 700 may also be configured with a face engaged configuration or a cavity engaged configuration.

Principles of the present disclosure may suitably be combined with various other principles related to transverse flux machines and/or commutated flux machines. For example, principles of the present disclosure may suitably be combined with principles for stators in transverse flux machines and commutated flux machines, for example principles for partial stators and/or gapped stators, as disclosed in U.S. patent application Ser. No. 12/611,728 filed on Nov. 3, 2009, now U.S. Pat. No. 7,851,965 entitled "TRANSVERSE AND/OR COMMUTATED FLUX SYSTEM STATOR CONCEPTS", the contents of which are hereby incorporated by reference in their entirety.

Principles of the present disclosure may also suitably be combined with principles for rotors in transverse flux machines and/or commutated flux machines, for example tape wound rotors and/or multipath rotors, as disclosed in U.S. patent application Ser. No. 12/611,733 filed on Nov. 3, 2009, now U.S. Pat. No. 7,923,886 entitled "TRANSVERSE AND/OR COMMUTATED FLUX SYSTEM ROTOR CONCEPTS", the contents of which are hereby incorporated by reference in their entirety.

Principles of the present disclosure may also suitably be combined with principles of polyphase transverse flux machines and/or polyphase commutated flux machines as disclosed in U.S. patent application Ser. No. 12/611,737 filed on Nov. 3, 2009, now U.S. Pat. No. 7,868,508 entitled "POLYPHASE TRANSVERSE AND/OR COMMUTATED FLUX SYSTEMS", the contents of which are hereby incorporated by reference in their entirety.

Principles of the present disclosure may also suitably be combined with principles of extended magnets, overhung rotors, and/or stator tooth overlap in transverse flux machines and/or commutated flux machines as disclosed in U.S. patent application Ser. No. 12/772,958 filed on May 3, 2010, now U.S. Patent Application Publication No. 2011/0169365 entitled "TRANSVERSE AND/OR COMMUTATED FLUX SYSTEMS CONFIGURED TO PROVIDE REDUCED FLUX LEAKAGE, HYSTERESIS LOSS REDUCTION, AND PHASE MATCHING", the contents of which are hereby incorporated by reference in their entirety.

Principles of the present disclosure may also suitably be combined with principles of phase offset in transverse flux machines and/or commutated flux machines as disclosed in a U.S. patent application Ser. No. 12/772,962 filed on May 3, 2010, now U.S. Patent Application Publication No. 2011/0169366 entitled "TRANSVERSE AND/OR COMMUTATED FLUX SYSTEM PHASE OFFSET", the contents of which are hereby incorporated by reference in their entirety.

Moreover, principles of the present disclosure may suitably be combined with any number of principles disclosed in any one of and/or all of the co-pending U.S. patent applications incorporated by reference herein. Thus, for example, a particular transverse flux machine and/or commutated flux machine (for example, a hub motor, a cassette motor, and/or the like) may incorporate use of a sixth-phase offset, use of extended magnets, use of an overhung rotor, use of stator tooth overlap, use of a tape wound rotor, use of a multipath rotor, use of a partial stator, use of a polyphase design, and/or the like. All such combinations, permutations, and/or other interrelationships are considered to be within the scope of the present disclosure.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. An electrical machine, comprising:
a rotor, a stator, and a coil, wherein at least one of the rotor or the stator is coupled to the wheel of an electric bicycle,
wherein the electrical machine is configured with a pole count in excess of 50,
wherein the electrical machine is configured with an outer diameter of less than six inches,
wherein the electrical machine is configured with a continuous, thermally stable torque density in excess of 10 Newton-meters per kilogram of active electrical and magnetic materials,
and
wherein the electrical machine is at least one of a transverse flux machine or a commutated flux machine.

2. The electrical machine of claim 1, wherein the electrical machine is a polyphase device.

3. The electrical machine of claim 1, wherein the rotor overhangs the stator on a first side of the stator and a second side of the stator in a direction parallel to an air gap between the rotor and the stator.

4. The electrical machine of claim 1, wherein at least two magnets in the electrical machine are extended in a direction away from the coil to a distance greater than a flux concentrator disposed between the at least two magnets.

5. The electrical machine of claim 1, wherein at least one of the rotor or the stator is configured with a sixth-phase offset.

6. The electrical machine of claim 1, wherein the electrical machine is configured to not interfere with a disc brake caliper of an electric bicycle.

7. The electrical machine of claim 1, wherein the electrical machine is coupled to a gear cassette of an electric bicycle.

8. The electrical machine of claim 1, wherein the plurality of magnets are configured with a width of less than 2 millimeters, and wherein the plurality of flux concentrators are configured with a width of less than 4 millimeters.

9. The electrical machine of claim 1, wherein the electrical machine is coupled to the wheel of the electric bicycle in a direct drive configuration.

10. The electrical machine of claim 1, wherein flux is switched in the electrical machine at a rate in excess of 125 Hz at a physical RPM of the electrical machine of less than 250 RPM.

11. The electrical machine of claim 1, wherein the electrical machine is configured with a peak cogging torque of less than 1.5 Newton-meters.

12. The electrical machine of claim 1, wherein a wire coupling the coil to a motor controller passes between the inner surface of a bearing and the axis of rotation of the electrical machine.

13. The electrical machine of claim 1, wherein the coil has a resistance of less than 0.1 ohms.

14. The electrical machine of claim 1, wherein the electrical machine is configured to operate with resistive coil losses of less than 20 watts when the electrical machine draws 20 amps of current.

15. The electrical machine of claim 1, wherein the continuous, thermally stable torque density is less than 50 Newton-meters per kilogram of active electrical and magnetic materials.

16. The electrical machine of claim 15, wherein the continuous, thermally stable torque density is in excess of 30 Newton-meters per kilogram of active electrical and magnetic materials.

17. The electrical machine of claim 15, wherein the continuous, thermally stable torque density is between 10-20 Newton-meters per kilogram of active electrical and magnetic materials.

18. The electrical machine of claim 17, wherein the continuous, thermally stable torque density is about 18 Newton-meters per kilogram of active electrical and magnetic materials.

19. The electrical machine of claim 15, wherein the continuous, thermally stable torque density is about 30 Newton-meters per kilogram of active electrical and magnetic materials.

20. An electrical machine, comprising:
a rotor, a stator, and a coil, wherein at least one of the rotor or the stator is coupled to the wheel of an electric bicycle,
wherein the rotor overhangs the stator on a first side of the stator and a second side of the stator in a direction parallel to an air gap between the rotor and the stator,
wherein the electrical machine is at least one of a transverse flux machine or a commutated flux machine,
wherein the electrical machine is configured with an outer diameter of less than six inches, and
wherein the electrical machine is configured with a continuous, thermally stable torque density in excess of 5 Newton-meters per kilogram of active electrical and magnetic materials.

21. The electrical machine of claim 20, wherein at least one of the rotor or the stator is configured with a sixth-phase offset.

22. The electrical machine of claim 20, wherein the continuous, thermally stable torque density is less than 50 Newton-meters per kilogram of active electrical and magnetic materials.

23. The electrical machine of claim 22, wherein the continuous, thermally stable torque density is in excess of 30 Newton-meters per kilogram of active electrical and magnetic materials.

24. The electrical machine of claim 22, wherein the continuous, thermally stable torque density is between 10-20 Newton-meters per kilogram of active electrical and magnetic materials.

25. The electrical machine of claim 24, wherein the continuous, thermally stable torque density is about 18 Newton-meters per kilogram of active electrical and magnetic materials.

26. The electrical machine of claim 22, wherein the continuous, thermally stable torque density is about 30 Newton-meters per kilogram of active electrical and magnetic materials.

* * * * *